US012713403B2

(12) United States Patent
He et al.

(10) Patent No.: US 12,713,403 B2
(45) Date of Patent: Aug. 18, 2026

(54) WIRELESS COMMUNICATION METHOD, TERMINAL DEVICE AND COMMUNICATION DEVICE

(71) Applicant: GUANGDONG OPPO MOBILE TELECOMMUNICATIONS CORP., LTD., Dongguan (CN)

(72) Inventors: Chuanfeng He, Dongguan (CN); Weijie Xu, Dongguan (CN); Zhisong Zuo, Dongguan (CN); Shengjiang Cui, Dongguan (CN); Rongyi Hu, Dongguan (CN); Zhi Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 322 days.

(21) Appl. No.: 18/404,565

(22) Filed: Jan. 4, 2024

(65) Prior Publication Data

US 2024/0155565 A1 May 9, 2024

Related U.S. Application Data

(63) Continuation of application No. PCT/CN2021/105722, filed on Jul. 12, 2021.

(51) Int. Cl.
*H04W 72/02* (2009.01)
*G06K 19/07* (2006.01)

(52) U.S. Cl.
CPC ........ *H04W 72/02* (2013.01); *G06K 19/0709* (2013.01)

(58) Field of Classification Search
CPC ... H04W 72/02; H04W 72/40; H04W 72/044; H04W 4/70; H04W 52/216;
(Continued)

(56) References Cited

U.S. PATENT DOCUMENTS 7,692,532 B2 * 4/2010 Fischer .............. G06K 17/0029 340/505
10,320,860 B1 * 6/2019 Bunner ................. H04W 4/023
(Continued)

FOREIGN PATENT DOCUMENTS

CN 101841776 A 9/2010
CN 102316584 A 1/2012
(Continued)

OTHER PUBLICATIONS

CATT: “UE Wakeup Mechanism and On-Demand Access for fNB-IoT UE Power Saving”, 3GPP Draft; R1-1707456_ENB-IOT_WAKEUP, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017 May 14, 2017 (May 14, 2017), pp. 1-4, XP051272664, p. 2-p. 3.
(Continued)

*Primary Examiner* — Jean A Gelin
(74) *Attorney, Agent, or Firm* — BAYES PLLC

(57) ABSTRACT

A wireless communication method, a terminal device and a communication device. In the method the type or terminal group to which a terminal device belongs is determined. A backscatter signal is sent or a downlink signal is monitored on the basis of a configuration resource corresponding to the type or terminal group to which the terminal device belongs. On the basis of the configuration resource corresponding to the type or terminal group to which the terminal device belongs, the backscatter signal is sent or the downlink signal is monitored, that is, the terminal devices of different types or different groups correspond to different configuration resources.

16 Claims, 8 Drawing Sheets

(58) Field of Classification Search

CPC ........... H04W 52/219; H04W 52/0235; H04W 52/0245; H04W 52/0248; H04W 72/51; H04W 76/14; H04W 76/28; G06K 19/0709

USPC .......................................................... 370/329

See application file for complete search history.

(56) References Cited

U.S. PATENT DOCUMENTS

| | | | | |
|---|---|---|---|---|
| 2006/0022800 | A1* | 2/2006 | Krishna | G06K 7/0008<br>340/10.2 |
| 2007/0075834 | A1* | 4/2007 | Armstrong | G06K 7/0008<br>340/10.1 |
| 2008/0001734 | A1* | 1/2008 | Stilp | H04L 12/2803<br>340/541 |
| 2008/0048835 | A1* | 2/2008 | O'Toole | G06K 19/0726<br>340/10.2 |
| 2008/0150698 | A1* | 6/2008 | Smith | G06K 19/0723<br>340/10.4 |
| 2009/0009295 | A1* | 1/2009 | Rofougaran | H04B 5/22<br>340/10.1 |
| 2012/0019363 | A1* | 1/2012 | Fein | G06K 19/072<br>340/10.1 |
| 2015/0363614 | A1* | 12/2015 | Yeager | G06K 7/10158<br>340/10.5 |
| 2016/0196455 | A1* | 7/2016 | Gudan | H04B 7/0617<br>340/10.5 |
| 2018/0032768 | A1* | 2/2018 | Ganesan | G06K 7/10297 |
| 2019/0173543 | A1* | 6/2019 | Ganesan | H01Q 21/28 |
| 2020/0000366 | A1* | 1/2020 | Katabi | G01S 13/765 |
| 2020/0187176 | A1* | 6/2020 | Chai | H04W 72/23 |
| 2022/0264641 | A1* | 8/2022 | Jia | H04L 5/0055 |
| 2023/0082194 | A1* | 3/2023 | Liu | H04W 52/0216 |
| 2023/0117493 | A1* | 4/2023 | Li | H04W 64/00<br>370/329 |

FOREIGN PATENT DOCUMENTS

| | | | |
|---|---|---|---|
| CN | 108243449 | B | 4/2021 |
| CN | 112637857 | A | 4/2021 |
| CN | 112956256 | A | 6/2021 |

OTHER PUBLICATIONS

CATT: "UE Power Saving and Wakeup Mechanism", 3GPP Draft; RP-171881_NR_POWERSAVING_WAKEUP, 3rd Generation Partnership Project (3GPP), Mobile Competence Centre; 650, Route Des Lucioles; F-06921 Sophia-Antipolis Cedex; France, vol. TSG RAN, No. Sapporo, Japan; Sep. 11, 2017-Sep. 14, 2017 Sep. 10, 2017 (Sep. 10, 2017), pp. 1-14, XP051324448, p. 8-p. 11.

Sony: "UE Power Saving in NR", 3GPP Draft; R1-1716649-UE Power Saving in NR V2, 3rd Generation Partnership Project (3GPP), Mobile Competence Centre; 650, Route Des Lucioles; F-06921 Sophia-Antipolis Cedex; France, vol. TSG RAN, No. Nagoya, Japan; Sep. 18, 2017-Sep. 21, 2017 Sep. 11, 2017 (Sep. 11, 2017), pp. 1-6, XP051329347, p. 2-p. 5.

Supplementary European Search Report in the European application No. 21949555.3, mailed on Aug. 7, 2024. 9 pages.

International Search Report in the international application No. PCT/CN2021/105722, mailed on Apr. 11, 2022, 5 pages with English translation.

English translation of the Written Opinion of the International Search Authority in the international application No. PCT/CN2021/105722, mailed on Apr. 11, 2022, 8 pages with English translation.

OPPO, "New SID: Study on Wireless Power Sourcing enabled Communication Services", 3GPP TSG-SA WG1 Meeting #94e, S1-211120, Electronic Meeting, May 10-20, 2021, Section 3, 3 pages.

Huawei, HiSilicon, "Passive IoT for 5G Advanced", 3GPP TSG RAN Rel-18 workshop RWS-210453, Electronic Meeting, Jun. 28-Jul. 2, 2021, Section 2, 5 pages.

* cited by examiner

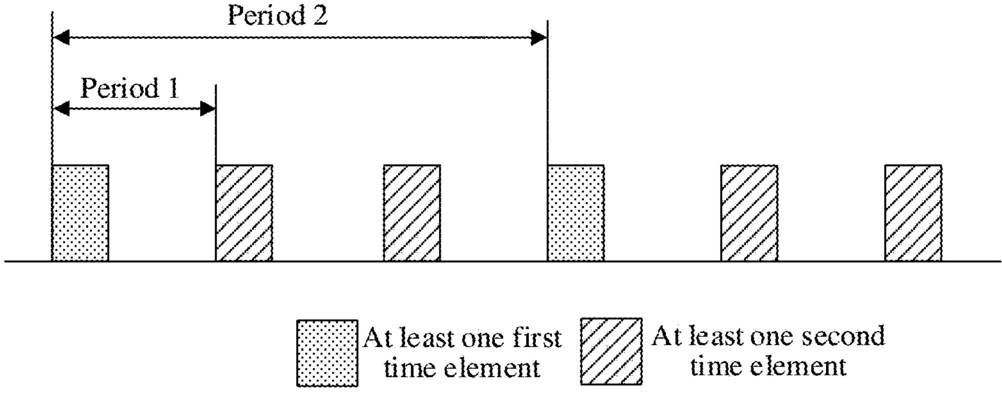
FIG. 8
300
Send configuration information, where the configuration information is used for a terminal device to determine a configuration resource for a type of the terminal device or a terminal group to which the terminal device belongs from resources configured according to the configuration information
S310
FIG. 9
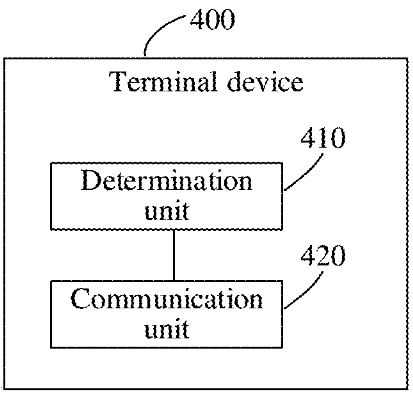
FIG. 10

WIRELESS COMMUNICATION METHOD, TERMINAL DEVICE AND COMMUNICATION DEVICE

CROSS-REFERENCE TO RELATED APPLICATION

This application is a continuation of International Application No. PCT/CN2021/105722, filed on Jul. 12, 2021 and entitled "WIRELESS COMMUNICATION METHOD, TERMINAL DEVICE AND COMMUNICATION DEVICE", the disclosure of which is incorporated therein by reference in its entirety.

TECHNICAL FIELD

Embodiments of the disclosure relate to a technical field of communication, particularly to a wireless communication method, a terminal device and a communication device.

BACKGROUND

When a semi-passive terminal with zero power consumption is far away from a network node, charging efficiency is greatly reduced. Power harvested in real time may not meet demand of instant communication, that is, the power is required to be harvested and stored before the communication. Therefore, for such type of terminals, how to save the harvested power to meet the power demand of the communication is an urgent technical problem in the technical field.

SUMMARY

According to a first aspect of the present disclosure, a wireless communication method is provided, and the method includes the following operations.

A type of a terminal device or a terminal group to which the terminal device belongs is determined.

A backscattered signal is sent or a downlink signal is listened for, based on a configuration resource for the type of the terminal device or the terminal group to which the terminal device belongs.

According to a second aspect of the present disclosure, a wireless communication method is provided, and the method includes the following operation.

Configuration information is sent.

Herein, the configuration information is used for a terminal device to determine a configuration resource for a type of the terminal device or a terminal group to which the terminal device belongs from resources configured according to the configuration information.

According to a third aspect of the present disclosure, a terminal device is provided, and the terminal device is configured to implement the method in the aforementioned first aspect or implementations thereof. Specifically, the terminal device includes functional modules configured to implement the method in the aforementioned first aspect or implementations thereof.

According to a fourth aspect of the present disclosure, a communication device is provided, and the communication device is configured to implement the method in the aforementioned second aspect or implementations thereof. Specifically, the communication device includes functional modules configured to implement the method in the aforementioned second aspect or implementations thereof.

According to a fifth aspect of the present disclosure, a terminal device is provided, and the terminal device includes a processor and a memory. The memory is configured to store a computer program, and the processor is configured to call and run the computer program stored in the memory to implement the method in the aforementioned first aspect or implementations thereof.

According to a sixth aspect of the present disclosure, a communication device is provided, and the communication device includes a processor and a memory. The memory is configured to store a computer program, and the processor is configured to call and run the computer program stored in the memory to implement the method in the aforementioned second aspect or implementations thereof.

According to a seventh aspect of the present disclosure, a chip is provided, and the chip is configured to implement the method in one of the aforementioned first aspect and second aspect, or implementations thereof. Specifically, the chip includes a processor, configured to call and run a computer program in a memory to enable a device installed with the chip to implement the method in one of the aforementioned first aspect and second aspect, or implementations thereof.

According to an eighth aspect of the present disclosure, a computer-readable storage medium is provided, and the computer-readable storage medium is configured for storing a computer program. The computer program, when executed by a computer, enables the computer to implement the method in one of the aforementioned first aspect and second aspect, or implementations thereof.

According to a ninth aspect of the present disclosure, a computer program product is provided, and the computer program product includes computer program instructions. The computer program instructions, when executed by a computer, enable the computer to implement the method in one of the aforementioned first aspect and second aspect, or implementations thereof.

According to a tenth aspect of the present disclosure, a computer program is provided. The computer program, when executed by a computer, enables the computer to implement the method in one of the aforementioned first aspect and second aspect, or implementations thereof.

BRIEF DESCRIPTION OF THE DRAWINGS

FIG. 8 is a block diagram of a first downlink configuration resource and a second downlink configuration resource according to an embodiment of the present disclosure.

FIG. 9 is a block diagram of a wireless communication method according to another embodiment of the present disclosure.

FIG. 10 is a block diagram of a terminal device according to an embodiment of the present disclosure.

DETAILED DESCRIPTION

Figure 1:
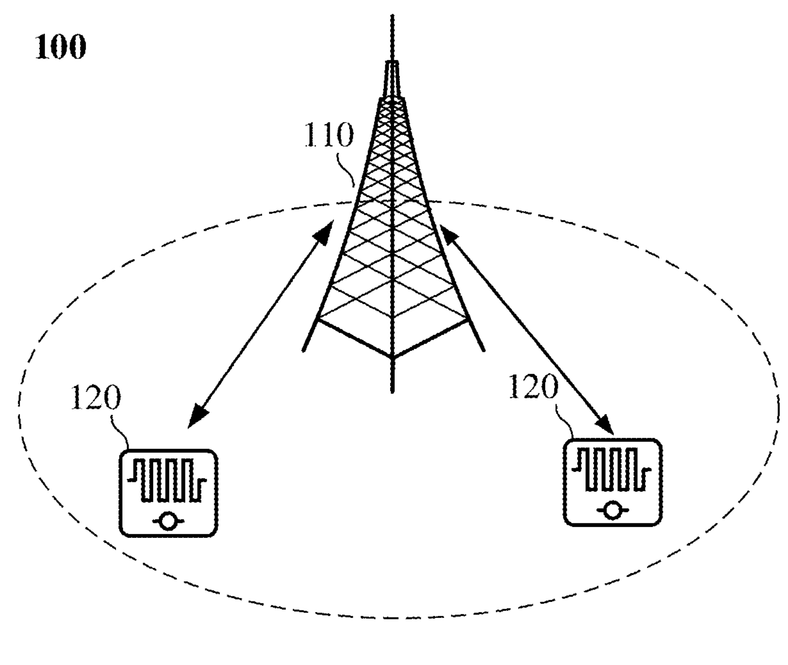
FIG. 1 is a schematic diagram of a communication system according to an embodiment of the present disclosure.

The technical solutions in the embodiments of the present disclosure will be described in combination with the drawings in the embodiments of the present disclosure. It is apparent that the described embodiments are partial embodiments of the present disclosure but not all embodiments. For the embodiments in the present disclosure, all other embodiments obtained by those of ordinary skill in the art without creative work shall fall within the protection scope of present disclosure.

It should be noted that the terms "system" and "network" in the present disclosure may be generally used interchangeably herein. In the present disclosure, the term "and/or" only indicates an association relationship for describing associated objects and represents that there are three relationships. For example, A and/or B may represent three conditions: i.e., independent existence of A, existence of both A and B and independent existence of B. In addition, the character "/" in the present disclosure generally represents that previous and next associated objects form an "or" relationship.

In the description of embodiments of the present disclosure, the term "corresponding" may represent that there is a direct correspondence or an indirect correspondence relationship between two objects, may further represent that there is an association relationship between the two objects, may further be a relationship between the indication and the object to be indicated, or, the configuration and the object to be configured, and the like.

The embodiments of the present disclosure may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system in the NR system, a LTE-based access to unlicensed spectrum (LTE-U) system, a NR-based access to unlicensed spectrum (NR-U) system, a Universal Mobile Telecommunication System (UMTS), a Wireless Local Area Network (WLAN), a Wireless Fidelity (WiFi), a next-generation communication system, a communication system with zero power consumption, a cellular Internet of Things (IoT), a cellular passive IoT, or other communication systems and the like.

Herein, the cellular IoT is a development product of the combination of a cellular mobile communication network and an IoT. A cellular passive IoT is also referred to as a passive cellular IoT, which is a combination of network devices and passive terminals. In the cellular passive IoT, the passive terminals may communicate with other passive terminals through the network devices. Or, the passive terminals may communicate in a Device to Device (D2D) communication mode, while the network devices only need to send a carrier signal (i.e., a power supply signal) to supply power to the passive terminals.

Generally, conventional communication systems support a limited number of connections and are easy to be implemented. However, with the development of communication technology, mobile communication systems may not only support conventional communication, but also support, for example, D2D communication, Machine to Machine (M2M) communication, Machine Type Communication (MTC), Vehicle to Vehicle (V2V) communication, and the like. Embodiments of the present disclosure may also be applied to such communication systems.

In an embodiment, the communication system in the embodiment of the present disclosure may be applied to a Carrier Aggregation (CA) scenario, a Dual Connectivity (DC) scenario, and a Standalone (SA) network distribution scenario.

Embodiments of the present disclosure are not limited to a spectrum of the application. For example, the embodiments of the present disclosure may be applied to a licensed spectrum or an unlicensed spectrum.

Exemplarily, FIG. 1 illustrates a communication system 100 to which the embodiments of the present disclosure are applied. The communication system 100 may include a network device 110. The network device 110 may be a device communicating with a terminal device 120 (also called a communication terminal, or a terminal). The network device 110 may provide a communication coverage for a specific geographical region and may communicate with a terminal device in the coverage.

One network device and two terminal devices are exemplarily shown in FIG. 1. In an embodiment, the communication system 100 may include multiple network devices, and another number of terminal devices may be included in coverage of each network device, which is not limited in the embodiments of the present disclosure.

In an embodiment, the wireless communication system 100 may further include another network entity such as a network controller and a mobility management entity, which is not limited in the embodiments of the present disclosure.

It should be noted that, in the embodiments of the present disclosure, a device in the network/system with a communication function may be referred to as a communication device. Taking the communication system 100 shown in FIG. 1 as an example, the communication device may include a network device 110 and a terminal device 120 both having a communication function. The network device 110 and the terminal device 120 may be devices described above, which is not described repeatedly here anymore. The communication device may further include other devices in the communication system 100 such as a network controller and a mobility management entity, which is not limited in the embodiments of the present disclosure.

Embodiments of the present disclosure describe various embodiments in combination with the terminal device and the network device. The network device may be a device for communicating with a mobile device, and the network device may be an Access Point (AP) in a WLAN, a Base Transceiver Station (BTS) in a GSM or CDMA, a base station (Node B, NB) in a WCDMA, an Evolutional Node B (eNB or eNodeB) in a LTE, a relay station or an AP, a vehicle-mounted device, a wearable device and a network device (gNB) in a NR network, or a network device in a future evolutional Public Land Mobile Network (PLMN) network, and the like.

In an embodiment of the present disclosure, the network device provides services for a cell, and the terminal device communicates with the network device through transmission resources (such as, frequency-domain resources, or spectrum resources) used by the cell. The cell may be a cell corresponding to the network device (for example, a base station). The cell may belong to a macro base station or a base station corresponding to a small cell (Small cell). The small cell herein may include, for example, a metro cell (Metro cell), a micro cell (Micro cell), a pico cell (Pico cell), and a femto cell (Femto cell). Such small cells have characteristics of a small coverage and low transmit power. It is applicable to provide high rate data transmission services.

In an embodiment of the present disclosure, the terminal device may further be referred to as a user equipment (UE), an access terminal, a user unit, a user station, a mobile station, a mobile platform, a remote station, a remote terminal, a mobile device, a user terminal, a terminal, a wireless communication device, a user proxy, or a user apparatus. The terminal device may be a Station (ST) in a WLAN, a cellular telephone, a cordless telephone, a Session Initiation Protocol (SIP) telephone, a Wireless Local Loop (WLL) station, a Personal Digital Processing (PDA) device, a handheld device with a wireless communication function, a computing device or other processing devices connected to a wireless modem, a vehicle-mounted device, a wearable device, a terminal device in a next generation communication system such as in an NR network or a future evolutional PLMN network, or a device with zero power consumption, and the like.

By way of example and not limitation, in an embodiment of the present disclosure, the terminal device may also be a wearable device. The wearable device may further be referred to as a wearable smart device, which is a general name of the wearable devices developed by applying wearable technology to intelligently design of daily wear, such as, glasses, gloves, a watch, clothes and shoes. The wearable device is a portable device that is worn directly on the body or integrated into the user's clothes or accessories. The wearable device is not only a hardware device, but also through software support, data interaction, and cloud interaction to achieve powerful functions. Generalized wearable smart devices include full functions, large sizes, and complete or partial functions that do not rely on smart phones, such as smart watches or smart glasses, and the like. The wearable smart devices may only focus on a certain type of application functions, which need to be used with other devices (e.g., smart phones), such as smart bracelets and smart jewelry for physical signs listening.

It should be noted that the device with zero power consumption may be understood as a device whose power consumption is lower than preset power consumption. For example, the device with zero power consumption includes a passive terminal and even a semi-passive terminal.

Exemplarily, the device with zero power consumption is a Radio Frequency Identification (RFID) tag, which relates to a technology for realizing automatic transmission and identification of contactless tag information through spatial coupling of radio frequency signals. The RFID tag is further referred to as a "radio frequency tag" or an "electronic tag". According to different power supply modes, electronic tags may be classified into active electronic tags, passive electronic tags and semi-passive electronic tags. An active electronic tag (also known as an electronic tag in an active manner) represents that the operating power of the electronic tag is provided by a battery, and the active electronic tag consists of the battery, a memory and an antenna. Being different from the way of activating a passive radio frequency, the active electronic tag sends information through a preset frequency band before battery replacement. A passive electronic tag (also known as an electronic tag in a passive manner) does not support a built-in battery. When the passive electronic tag approaches a reader-writer, the electronic tag comes into a near-field range formed by radiation of an antenna of the reader-writer, an induced current is generated by an antenna of the electronic tag through electromagnetic induction, and the induced current drives a chip circuit of the electronic tag. The chip circuit transmits identification information stored in the electronic tag to the reader-writer through the antenna of the electronic tag. A semi-passive electronic tag (also known as an electronic tag in a semi-active manner) inherits the advantages of a small size, a light weight, a low price and a long service life of the passive electronic tag. When there is no access by the reader-writer, the built-in battery only supplies the power to a few circuits in the chip; and only when there is an access by the reader-writer, the built-in battery supplies the power to the RFID chip, thereby increasing a reading-writing distance of the tag, and further improving reliability of communication.

A RFID system is a wireless communication system. The RFID system is composed of an electronic tag (TAG) and a reader-writer (Reader/Writer). The electronic tag includes coupling components and chips. Each electronic tag has a unique electronic code, which is placed on a target to be measured, to mark the target object. The reader-writer may not only read information from the electronic tag, but also write information to the electronic tag, and meanwhile, supply power needed for the communication for the electronic tag.

Power harvesting and backscattering communication technologies are used in the communication with zero power consumption. In order to understand the technical solutions of the embodiments of the present disclosure, the related technology of zero power consumption is explained.

Figure 2:
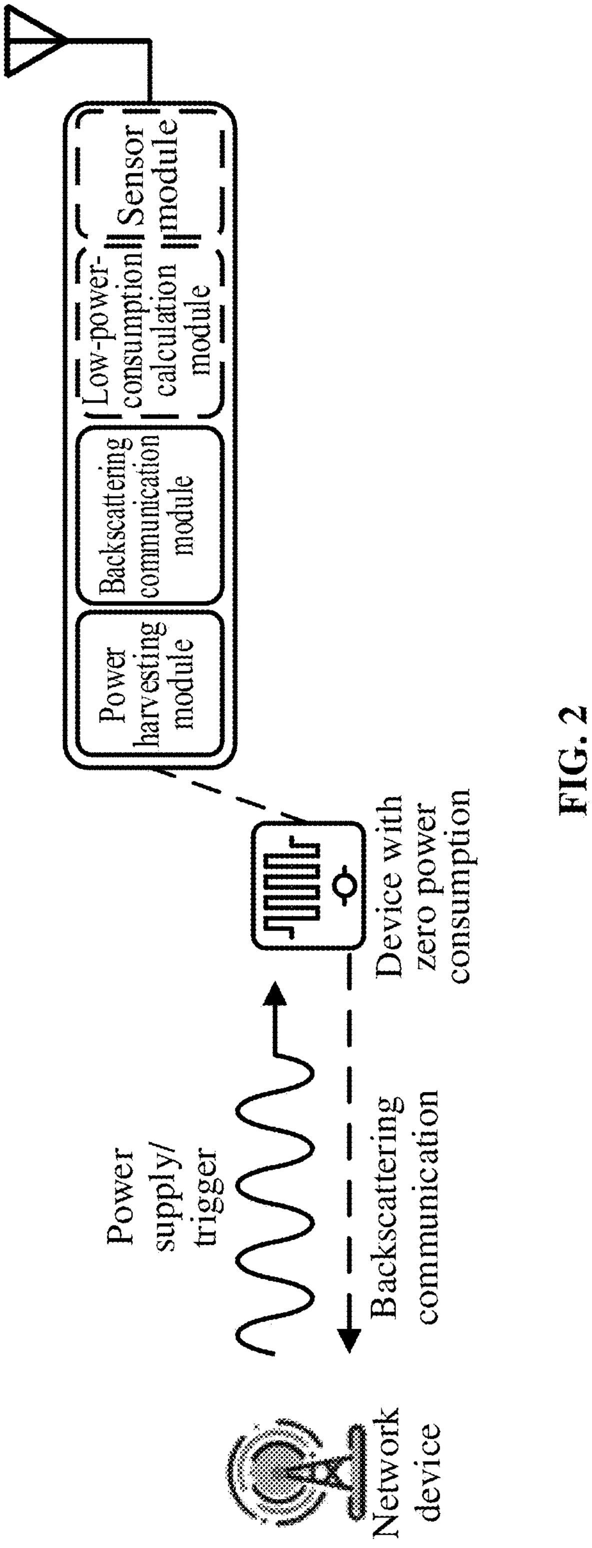
FIG. 2 is a schematic diagram of a communication system with zero power consumption according to the present disclosure.

FIG. 2 is a schematic diagram of a communication system with zero power consumption according to the present disclosure.

As shown in FIG. 2, the communication system with zero power consumption is composed by a network device and a terminal with zero power consumption. The network device is configured to send a wireless power supply signal and a downlink communication signal to the terminal with zero power consumption, and also receive a backscattered signal from the terminal with zero power consumption. A basic terminal with zero power consumption includes a power harvesting module, a backscattering communication module and a low-power-consumption calculation module. In addition, the terminal with zero power consumption may further include a memory for storing some basic information (such as, article identification, etc.) or a sensor for obtaining sensing data (such as, ambient temperature and ambient humidity).

The communication with zero power consumption may further be referred to as communication based on the terminal with zero power consumption. The key technique of the communication with zero power consumption mainly includes radio frequency (RF) power harvesting and backscattering communication.

1. RF Power Harvesting

Figure 3:
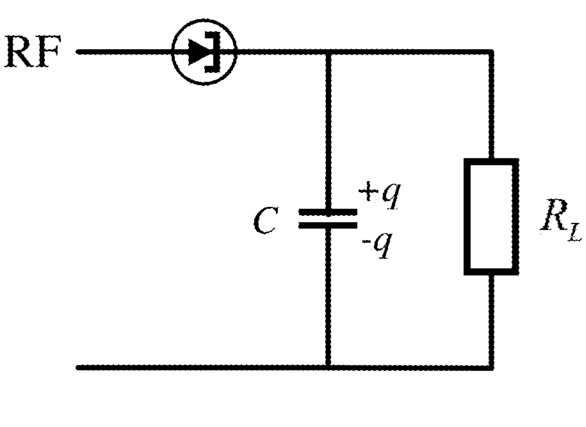
FIG. 3 is a schematic diagram of principle of power harvesting according to an embodiment of the present disclosure.

FIG. 3 is a schematic diagram of power harvesting according to an embodiment of the present disclosure.

As shown in FIG. 3, a RF power harvesting module is configured to harvest space electromagnetic wave energy based on a principle of electromagnetic induction, and obtain the power needed to drive the terminal with zero power consumption, such as to drive a demodulation and modulation module with zero power consumption, reading of the sensor and memory, and the like. Therefore, the terminal with zero power consumption does not need a conventional battery.

2. Backscattering Communication

Figure 4:
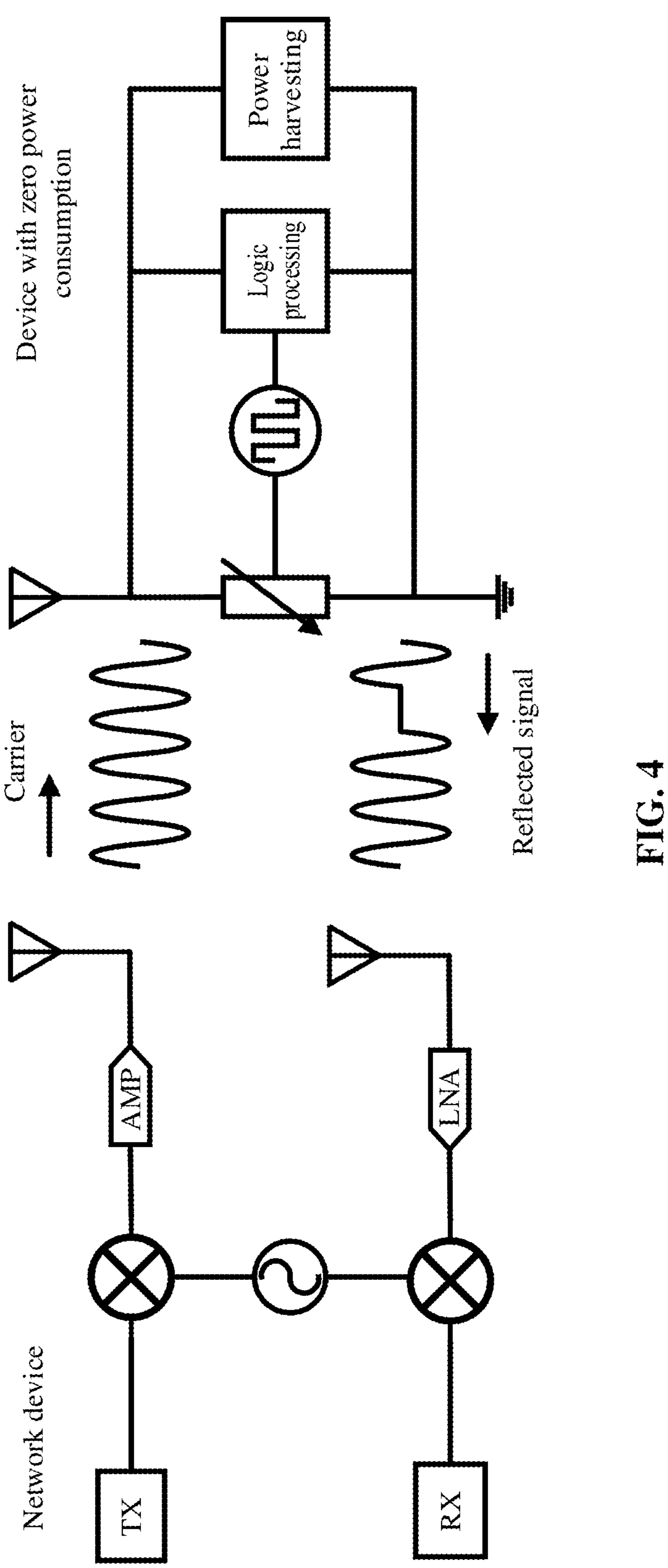
FIG. 4 is a schematic diagram of backscattering communication according to an embodiment of the present disclosure.

FIG. 4 is a schematic diagram of backscattering communication according to an embodiment of the present disclosure.

As shown in FIG. 4, the terminal in the communication with zero power consumption receives a wireless signal sent by the network, modulates the wireless signal, loads information to be sent and radiates the modulated signal through an antenna. Such a process for information transmission is referred to as the backscattering communication.

It should be noted that the principle of the backscattering communication shown in FIG. 4 is explained through the device with zero power consumption and a network device. Actually, any device with a function of backscattering communication can realize the backscattering communication.

The backscattering communication is closely related to load modulation, in which circuit parameters of an oscillation loop of the terminal with zero power consumption is adjusted and controlled according to a beat of a data flow, such that the impedance and phase of the terminal with zero power consumption are changed accordingly, to complete the modulation process. The load modulation technology mainly includes resistance load modulation and capacitance load modulation.

Figure 5:
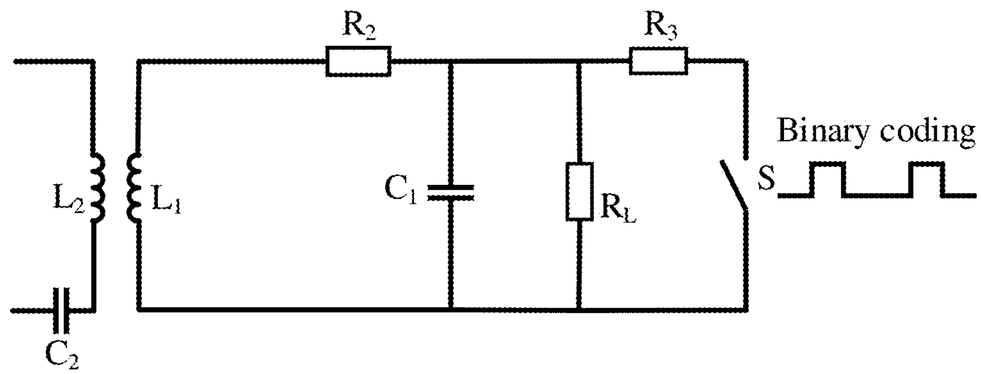
FIG. 5 is a schematic diagram of a circuit for resistance load modulation according to an embodiment of the present disclosure.

FIG. 5 is a schematic diagram of a circuit for resistance load modulation according to an embodiment of the present disclosure.

As shown in FIG. 5, for the resistance load modulation, a load is connected in parallel with a resistor, which is referred to as a load modulation resistor. The resistor is turned on or off based on control of a binary data flow. The turn-on or turn-off of the resistor may cause a change of a circuit voltage, so that Amplitude Shift Keying (ASK) modulation can be realized. That is, the modulation and transmission of the signal can be realized by adjusting the amplitude of the backscattered signal of the terminal with zero power consumption. Similarly, for the capacitance load modulation, a resonant frequency of the circuit may be changed by controlling a capacitor to be on and off, to realize Frequency Shift Keying (FSK) modulation. That is, the modulation and transmission of the signal can be realized by adjusting the operating frequency of the backscattered signal of the terminal with zero power consumption.

The terminal with zero power consumption modulates the incoming signal in the manner of the load modulation, and thus, the process of the backscattering communication is realized. Therefore, the terminal with zero power consumption has the following significant advantages.

1. The terminal device does not actively send the signal, but realizes the backscattering communication by modulating the incoming signal.
2. The terminal device does not rely on the conventional active power-amplifier transmitter, but uses a low-power-consumption calculation unit to greatly reduce the hardware complexity.
3. Battery-free communication may be realized in conjunction with the power harvesting.

It should be noted that the terminal device may be the terminal with zero power consumption (such as, a passive terminal, or even a semi-passive terminal). Or, the terminal device may even be a device that is not a terminal with zero power consumption, such as, an ordinary terminal which can perform the backscattering communication in some cases.

In an implementation, the data sent by the terminal device may use different forms of codes to represent binary "1" and "0". The radio frequency identification system generally uses one of the following coding methods: Non-Return to Zero (NRZ) coding, Manchester coding, Unipolar RZ coding, Differential Binary Phase (DBP) coding, Miller coding and differential dynamic coding. Generally speaking, 0 and 1 are represented by different pulse signals.

Exemplarily, based on a power source and utilization manner of the terminal with zero power consumption, the terminal with zero power consumption may be classified into the following types.

1. Passive Terminal with Zero Power Consumption

The terminal with zero power consumption does not need the built-in battery. When the terminal with zero power consumption approaches the network device (such as the reader-writer in the RFID system), the terminal with zero power consumption comes into the near-field range formed by the radiation of the antenna of the network device. Therefore, the induced current is generated by the antenna of the terminal with zero power consumption through the electromagnetic induction, and the induced current drives the low-power-consumption chip circuit of the terminal with zero power consumption. Demodulation of a forward link signal and modulation of a backward link signal can be realized. For the backscattered link, the terminal with zero power consumption implements the signal transmission in the backscattering manner.

It can be seen that the passive terminal with zero power consumption does not need the built-in battery to drive either the forward link or the backward link Thus, the passive terminal with zero power consumption is a terminal with real zero power consumption. The passive terminal with zero power consumption does not need the battery, the RF circuit and baseband circuit thereof are very simple, and the passive terminal with zero power consumption does not need devices such as a Low Noise Amplifier (LNA), a Power Amplifier (PA), a crystal oscillator, an Analog to Digital Converter (ADC), and the like. Therefore, the passive terminal with zero power consumption has many advantages, e.g., having a small size, a light weight, a very cheap price and a long service life.

2. Semi-Passive Terminal with Zero Power Consumption

The semi-passive terminal with zero power consumption is not equipped with a conventional battery, but the RF power harvesting module can be used to harvest the radio wave energy and store the harvested power in a power storage unit (such as a capacitor). After obtaining the power, the power storage unit may drive the low-power-consumption chip circuit of the terminal with zero power consumption, to realize the demodulation of the forward link signal and the modulation of the backward link signal. For the backscattered link, the terminal with zero power consumption implements the signal transmission in the backscattering manner.

It can be seen that the semi-passive terminal with zero power consumption does not need the built-in battery to drive either the forward link or the backward link Although the power stored by the capacitor is used during the operation, the power comes from the radio energy harvested by the power harvesting module. Thus, the semi-passive terminal with zero power consumption is also a terminal with real zero power consumption. The semi-passive terminal with zero power consumption inherits many advantages of the passive terminal with zero power consumption. Therefore, the semi-passive terminal with zero power consumption has many advantages, such as having a small size, a light weight, a very cheap price and a long service life.

3. Active Terminal with Zero Power Consumption

In some scenarios, the used terminal with zero power consumption may also be an active terminal with zero power consumption, which may have the built-in battery. The battery is used to drive the low-power-consumption chip circuit of the terminal with zero power consumption, to realize the demodulation of the forward link signal and the modulation of the backward link signal. However, for the backscattered link, the terminal with zero power consumption implements the signal transmission in the backscattering manner. Therefore, the zero power consumption of such type of terminals mainly lies in that the signal transmission in the backward link does not need the power of the terminal itself, but uses the manner of backscattering. That is to say, the active terminal with zero power consumption supplies the power to the RFID chip through the built-in battery, thereby increasing the reading-writing distance of the terminal with zero power consumption, and further improving reliability of communication. Thus, the active terminal with zero power consumption may be applied in some scenarios with relatively high requirements on the communication distance and reading delay.

Exemplarily, the terminal with zero power consumption may perform the power harvesting based on a power supply signal.

In an embodiment, in terms of a carrier of the power supply signal, the power supply signal may be from a base station, a smart phone, a smart gateway, a charging station, a micro base station, and the like.

In an embodiment, in terms of a frequency band of the power supply signal, the power supply signal may be a signal with a low frequency, an intermediate frequency, a high frequency, and the like.

In an embodiment, in terms of a waveform of the power supply signal, the power supply signal may be of a sine wave, a square wave, a triangular wave, a pulse, a rectangular wave, and the like.

In an embodiment, the power supply signal may be a continuous wave or a non-continuous wave (i.e., a certain time interruption is allowed).

In an embodiment, the power supply signal may be a certain signal specified in the 3GPP standard. For example, the power supply signal may be a Sounding Reference Signal (SRS), a Physical Uplink Shared Channel (PUSCH), a Physical Random Access Channel (PRACH), a Physical Uplink Control Channel (PUCCH), a Physical Downlink Control Channel (PDCCH), a Physical Downlink Shared Channel (PDSCH), a Physical Broadcast Channel (PBCH), and the like.

It should be noted that, since a carrier signal sent by the aforementioned network device may also be used to supply power to the device with zero power consumption. The carrier signal may also be referred to as the power supply signal.

Exemplarily, the terminal with zero power consumption may perform the backscattering communication based on a trigger signal that is received. In an embodiment, the trigger signal may be used to schedule or trigger the terminal with zero power consumption to implement the backscattering communication. In an embodiment, the trigger signal carries scheduling information from the network device, or the trigger signal is a scheduling signaling or a scheduling signal sent by the network device.

In an embodiment, in terms of a carrier of the trigger signal, the trigger signal may be from a base station, a smart phone, a smart gateway, and the like.

In an embodiment, in terms of a frequency band of the trigger signal, the trigger signal may be a signal with a low frequency, an intermediate frequency, a high frequency, and the like.

In an embodiment, in terms of a waveform of the trigger signal, the trigger signal may be a sine wave, a square wave, a triangular wave, a pulse, a rectangular wave, and the like.

In an embodiment, the trigger signal may be a continuous wave or a non-continuous wave (i.e., a certain time interruption is allowed).

In an embodiment, the trigger signal may be a certain signal specified in the 3GPP standard. For example, the trigger signal may be a SRS, a PUSCH, a PRACH, a PUCCH, a PDCCH, a PDSCH, a PBCH, and the like.

It should be noted that the power supply signal and the trigger signal may be one signal or two independent signals, which are not specifically limited in the present disclosure.

With the increasing application demand in the 5G industry, there are more and more types and application scenarios of connectors, and thus, there will be higher requirements for the price and power consumption of communication terminals. The application of battery-free and low-cost passive IoT devices has become a key technology of cellular IoT, which can enrich the types and number of terminals in the network, and then really realize the Internet of Everything. Here, passive IoT devices may be based on existing devices with zero power consumption, such as devices using the Radio Frequency Identification (RFID) technology, and extended on this basis to be suitable for the cellular IoT.

In actual network deployment, a technical bottleneck faced by the technology of the passive zero-power-consumption communication is the limited coverage distance of the forward link, which is mainly caused by the fact that a communication distance of the forward link is limited by a signal strength of a wireless signal reaching the terminal with zero power consumption. Based on the above implementation process, the terminal with zero power consumption generally needs to consume 10 microwatts (uw) of power to drive the low-power-consumption circuit. This means that the signal power reaching the terminal with zero power consumption needs to be at least −20 dBm. Limited by the requirements of radio supervision, a transmission power of the network device is generally not too large. For example, in an ISM frequency band where the RFID operates, the maximum transmission power is 30 dBm. Therefore, considering a radio propagation loss in space, the transmission distance of the passive terminal with zero power consumption is generally in a range of 10 m to tens of meters.

The semi-passive terminal with zero power consumption has a potential to significantly expand the communication distance. This is because the semi-passive terminal with zero power consumption may harvest radio waves through the RF power harvesting module, and thus can continuously obtain and store the radio energy in the power storage unit. After obtaining enough power, the power storage unit may drive the low-power-consumption circuit to operate for signal demodulation in the forward link and signal modulation in the backward link. Therefore, in this case, the semi-passive terminal with zero power consumption is equivalent to an active terminal, and the downlink coverage of the semi-passive terminal with zero power consumption depends on a receiver sensitivity of the downlink signal, which is generally far below a RF power harvesting threshold. Based on the current processes, the power harvesting module may harvest the power and input electric power to the power storage unit when the received radio signal strength is not lower than −30 dBm. As such, the coverage of the forward link of the semi-passive terminal with zero power consumption depends on the RF power harvesting threshold (e.g., −30 dBm). Compared with the passive terminal with zero power consumption, the received radio signal strength is relaxed from −20 dBm to −30 dBm, such that a link budget gain of 10 dB can be obtained, and therefore the downlink coverage can be improved by more than 3 times.

However, while improving the coverage of the forward link, the semi-passive terminal with zero power consumption also faces a problem that the charging efficiency is reduced. With the decrease of the received signal strength, the power that can be harvested and stored by the power harvesting module is greatly reduced. For example, when the received signal strength is −30 dBm (i.e., 1 microwatt), the power that can be harvested and stored is far less than 1 microwatt (the power harvesting efficiency is greatly reduced). On the other hand, as mentioned above, the low-power-consumption circuit of the terminal with zero power consumption may need to consume an average power of 10 uw. It can be seen from two aspects that, when the semi-passive terminal with zero power consumption is far away from the network device, the charging efficiency is greatly reduced. Power harvested in real time may not meet the demand of instant communication, that is, the power required to be harvested and stored before the communication. Therefore, the power harvested by such type of terminals needs to be used sparingly to meet the power requirements of communication. That is, when the terminal with zero power consumption is far away from the network station, the speed of obtaining and storing the power by the power harvesting is very slow. Therefore, when communicating with such type of terminals, the efficient utilization of the obtained power needs to be considered, so that the power obtained by the power harvesting can meet the requirements of communication.

The embodiments of the present disclosure provide a wireless communication method, a terminal device and a communication device, which can save the power harvested by the terminal device and improve the utilization efficiency of the power, thereby meeting the power demand of communication.

Specifically, on the one hand, by configuring a specific uplink transmission resource for a terminal device of a first type or belonging to a first terminal group, it is possible to reduce a possibility of contention and confliction between such type of terminals and other terminals in uplink transmission, and also to improve a success rate of the uplink transmission. On the other hand, by configuring a specific downlink transmission resource for the terminal device of the first type or belonging to the first terminal group, the listening for the downlink transmission by such type of terminals can be reduced, to further reduce unnecessary power consumption.

Figure 6:
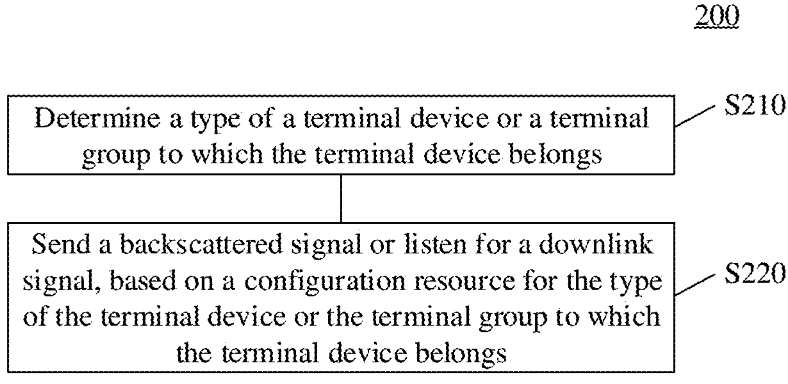
FIG. 6 is a block diagram of a wireless communication method according to an embodiment of the present disclosure.

FIG. 6 shows a schematic flowchart of a wireless communication method 200 according to an embodiment of the present disclosure, where the method 200 may be performed by a terminal device. The terminal device is the terminal device 120 as shown in FIG. 1. In another example, the terminal device is a terminal with zero power consumption.

As shown in FIG. 6, the method 200 includes the following operations S210 and S220.

At the operation S210, a type of a terminal device or a terminal group to which the terminal device belongs is determined.

At the operation S220, a backscattered signal is sent or a downlink signal is listened for, based on a configuration resource for the type of the terminal device or the terminal group to which the terminal device belongs.

In other words, the network device may configure the specific configuration resource for the terminal device of the first type or belonging to the first terminal group, which is different from a configuration resource configured for a terminal device of a second type or belonging to a second terminal group. Correspondingly, the terminal device sends the backscattered signal or listens for the downlink signal, based on the configuration resource for the type of the terminal device or the terminal group to which the terminal device belongs. For example, in a case that the terminal device is of the first type or belongs to the first terminal group, the backscattered signal is sent or the downlink signal is listened for, based on the configuration resource for the first type or the first terminal group. In a case that the terminal device is of the second type or belongs to the second terminal group, the backscattered signal is sent or the downlink signal is listened for based on the configuration resource for the second type or the second terminal group.

The backscattered signal is sent or the downlink signal is listened for, based on the configuration resource for the type of the terminal device or the terminal group to which the terminal device belongs. That is, different configuration resources are configured for terminal devices of different types or belonging to different terminal groups, which can prevent resource confliction between terminal devices of different types or belonging to different groups, and also improve data transmission reliability. Particularly, for the terminal device with the limited power, such as the terminal that needs to harvest and store the power for communication and is far away from the network device, the success rate of resource contention can be improved by configuring dedicated resources for such type of terminals. Therefore, the time and power consumption required for successful data transmission can be reduced, the power harvested or stored by the terminal device can be saved, and the efficiency of power utilization can be improved, thereby meeting the power demand during the communication.

In some embodiments, the type of the terminal device includes a first type and a second type; the terminal group to which the terminal device belongs includes a first terminal group and a second terminal group; at least one of the first type or the first terminal group includes terminal devices with limited power; and at least one of the second type or the second terminal group includes other terminal devices than the terminal devices with the limited power.

In other words, the terminal device may be classified into two types, i.e., the first type and the second type. Similarly, the terminal device may be classified into two terminal groups, i.e., the first terminal group and the second terminal group. Of course, in other alternative embodiments, more than two types or terminal groups may be defined, which are not specifically limited in the present disclosure. For example, the terminal devices may be classified into at least two types or at least two terminal groups.

In an embodiment, the first type or the first terminal group includes terminal devices with a power harvesting function.

In an embodiment, the first type or the first terminal group includes terminal devices that are far away from a wireless power supply node.

In an embodiment, the first type or the first terminal group includes terminal devices that are less efficient in power harvesting.

In an embodiment, the first type or the first terminal group includes semi-passive terminal devices with zero power consumption.

It should be noted that the type and the terminal group according to the embodiments of the present disclosure can be exchanged equally. In other words, the type can be replaced with the terminal group, or the terminal group can be replaced with the type. For example, terminal devices of the same type may be terminal devices within the same terminal group, and the terminal devices within the same terminal group may be the terminal devices of the same type. For instance, in a case that the type of the terminal device is the first type, the terminal group to which the terminal device belongs is the first terminal group. Similarly, in a case that the type of the terminal device is the second type, the terminal group to which the terminal device belongs is the second terminal group.

In some embodiments, the type of the terminal device includes a first type and a second type; the terminal group to which the terminal device belongs includes a first terminal group and a second terminal group; and the configuration resource includes a first uplink configuration resource for the first type or the first terminal group, and a second uplink configuration resource for the second type or the second terminal group.

In other words, the network device may configure the specific uplink configuration resource (i.e., a first uplink configuration resource) for the terminal device of the first type or belonging to the first terminal group, which is different from an uplink configuration resource (i.e., a second uplink configuration resource) configured for the terminal device of the second type or belonging to the second terminal group. Correspondingly, the terminal device sends the backscattered signal based on the uplink configuration resource for the type of the terminal device or the terminal group to which the terminal device belongs. For example, in a case that the terminal device is of the first type or belongs to the first terminal group, the terminal device may send the backscattered signal based on the first uplink configuration resource. In a case that the terminal device is of the second type or belongs to the second terminal group, the terminal device may send the backscattered signal based on the second uplink configuration resource.

In an embodiment, the first uplink configuration resource is completely or partially different from the second uplink configuration resource; or, the first uplink configuration resource includes the second uplink configuration resource.

As an example, a time-domain resource of the first uplink configuration resource is completely or partially different from a time-domain resource of the second uplink configuration resource; or, the time-domain resource of the first uplink configuration resource includes the time-domain resource of the second uplink configuration resource. As another example, a frequency-domain resource of the first uplink configuration resource is completely or partially different from a frequency-domain resource of the second uplink configuration resource; or, the frequency-domain resource of the first uplink configuration resource includes the frequency-domain resource of the second uplink configuration resource.

In an embodiment, the first uplink configuration resource or the second uplink configuration resource includes at least one of a contention resource or an unlicensed resource.

Here, the unlicensed resource may also be referred to as an unlicensed-based transmission resource. The contention resource may also be referred to as a contention-based transmission resource.

As an example, the first uplink configuration resource is a first uplink unlicensed resource, and the second uplink configuration resource is a second uplink unlicensed resource. The first uplink unlicensed resource is completely or partially different from the second uplink unlicensed resource; or, the first uplink unlicensed resource includes the second uplink unlicensed resource. As another example, the first uplink configuration resource is a first contention resource, and the second uplink configuration resource is a second contention resource. The first contention resource is completely or partially different from the second contention resource; or, the first contention resource includes the second contention resource.

In the embodiment, in a case that the first uplink configuration resource or the second uplink configuration resource includes the contention resource, for the terminal device of the first type or belonging to the first terminal group, it takes a long time for the power harvesting to reach a certain threshold due to the low efficiency of the power harvesting; thus, it is expected that the uplink transmission can be successfully performed by using the harvested power. For the contention-based uplink transmission, in a case of a failure of the uplink transmission due to the confliction, the terminal device initiates the contention-based uplink transmission again after a fallback time. For the terminal device of the first type or belonging to the first terminal group, the terminal device may wait a long time for the power harvesting due to the slow power harvesting speed, to initiate the uplink transmission again. In order to avoid such situation, it needs to improve the success rate of the contention-based uplink transmission of such type of terminals. In the embodiment, the network device may configure the specific uplink transmission resource for the terminal device of the first type or belonging to the first terminal group, and the terminal device of the second type or belonging to the second terminal group does not use the specific uplink transmission resource. The terminal device of the second type or belonging to the second terminal group may be, for example, the terminal with faster power harvesting or the active terminal, or the passive terminal for backscattering communication, that is, the terminal which does not need long-time power harvesting. Configuring the specific uplink transmission resource for the terminal device of the first type or belonging to the first terminal group can prevent the terminal device of the first type or belonging to the first terminal group from contending with the terminal device of the second type or belonging to the second terminal group on the same transmission resource. It can thus improve the success rate for the resource contention of the terminal device of the first type or belonging to the first terminal group, thereby reducing the time and power consumption required for the successful data transmission. Therefore, the power harvested or stored by the terminal device of the first type or belonging to the first terminal group can be saved, the utilization efficiency of the power can be improved, and the power demand of such type of terminals can be met during communication.

In an embodiment, the contention resource includes, but is not limited to, a RACH resource.

In the embodiment, in a case that the first uplink configuration resource or the second uplink configuration resource includes an unlicensed resource, the network device configures a specific unlicensed-based uplink resource for the terminal device of the first type. The specific unlicensed-based uplink resource has a certain period, and the terminal device of the first type or belonging to the first terminal group can select the specific unlicensed-based uplink resource for transmission upon completion of the power harvesting. Since the cost of the unlicensed uplink resource is relatively large and the utilization efficiency is not as high as that of dynamic scheduling, the network device may configure the same uplink unlicensed resource for multiple terminals. If the multiple terminals perform transmission on the same unlicensed uplink resource at the same time, the base station may not receive the transmissions correctly due to mutual interference. Thus, in a case that the same unlicensed uplink resource is configured for both the terminal device of the first type or belonging to the first terminal group and the terminal device of the second type or belonging to the second terminal group, when the confliction occurs, a delay caused by the failure of the uplink transmission of the terminal device of the first type or belonging to the first terminal group is large. In the embodiment, when the network device configures the specific unlicensed uplink resource for the terminal device of the first type or belonging to the first terminal group, it can prevent the conflict between the terminal device of the first type or belonging to the first terminal group and the terminal device of the second type or belonging to the second terminal group on the same transmission resource. It can thus improve the success rate for the resource contention of the terminal device of the first type or belonging to the first terminal group, thereby reducing the time and power consumption required for the successful data transmission. Therefore, the power harvested or stored by the terminal device of the first type or belonging to the first terminal group can be saved, the utilization efficiency of the power can be improved, and the power demand of such type of terminals can be met during communication.

In an embodiment, the first uplink configuration resource or the second uplink configuration resource may be a configured grant (CG) resource. That is, the network device activates one (or, a first) uplink grant to the terminal device, and then the terminal device may keep using the resource specified by the (first) uplink grant for the uplink transmission until receiving deactivation. The uplink unlicensed spectrum may allow that the terminal device does not need to send a scheduling request for resources to the network device. Compared with the data transmission of dynamic scheduling, and data scheduling is omitted and the delay caused by the scheduling request is eliminated. In an embodiment, the CG resource includes the following two resource types:

Configured grant type 1 (type 1), configured by a Radio Resource Control (RRC) signaling or a high-level signaling, for example, a configured grant information element (IE ConfiguredGrantConfig).

Configured grant type 2 (type 2), for which Downlink Control Information (DCI) is used to indicate activation and deactivation of the uplink unlicensed spectrum. The required parameters are configured by the configured grant information element (IE ConfiguredGrantConfig), and are however only used when being activated by the DCI.

In an embodiment, the first uplink configuration resource is greater than the second uplink configuration resource.

In the embodiment, the first uplink configuration resource is designed to be greater than the second uplink configuration resource, which can reduce the possibility of the uplink transmission failure of the terminal device of the first type or belonging to the first terminal group.

As an example, the number of time elements of the first uplink configuration resource is greater than the number of time elements of the second uplink configuration resource; or, a length of the time-domain resource of the first uplink configuration resource is greater than a length of the time-domain resource of the second uplink configuration resource. As another example, the number of physical resource blocks of the first uplink configuration resource is greater than the number of physical resource blocks of the second uplink configuration resource; or, a width of the frequency-domain resource of the first uplink configuration resource is greater than a width of the frequency-domain resource of the second uplink configuration resource.

In an embodiment, a period of the first uplink configuration resource is less than a period of the second uplink configuration resource.

As an example, a period of the time elements of the first uplink configuration resource is less than a period of the time elements of the second uplink configuration resource.

In an embodiment, the second uplink configuration resource is configured to transmit a backscattered signal of the second type or the second terminal group, and a backscattered signal of the first type or the first terminal group.

In other words, the second uplink configuration resource may be used not only to transmit the backscattered signal of the terminal device of the second type or belonging to the second terminal group, but also to transmit the backscattered signal of the terminal device of the first type or belonging to the first terminal group. Or, the second uplink configuration resource is the common resource for the backscattered signal of the terminal device of the second type or belonging to the second terminal group, and the backscattered signal of the terminal device of the first type or belonging to the first terminal group. That is, the terminal device of the first type or belonging to the first terminal group can further obtain the uplink transmission resource configured by the network device for the terminal device of the second type or belonging to the second terminal group, and can also use such transmission resources for the uplink transmission at the same time.

Figure 7:
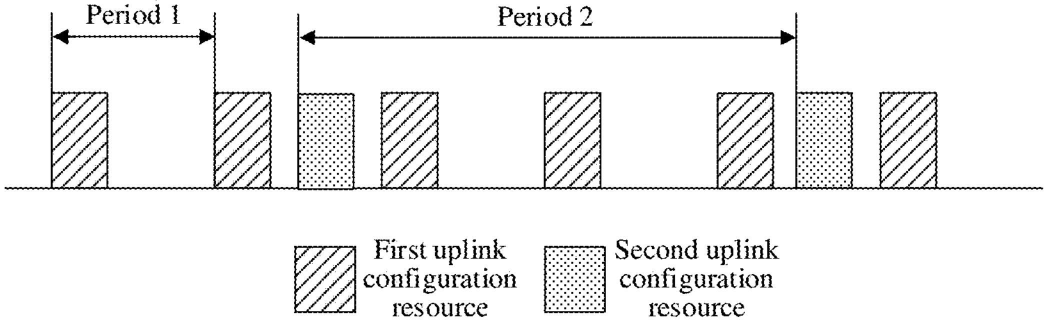
FIG. 7 is a block diagram of a first uplink configuration resource and a second uplink configuration resource according to an embodiment of the present disclosure.

FIG. 7 is a block diagram of a first uplink configuration resource and a second uplink configuration resource according to an embodiment of the present disclosure.

As shown in FIG. 7, the first uplink resource configured for the terminal device of the first type or belonging to the first terminal group has a shorter period 1. Therefore, more uplink resources can be selected by the terminal device of the first type or belonging to the first terminal group, thereby reducing the contention and confliction between terminal devices of the first type or belonging to the first terminal group, and further improving the success rate of the uplink transmission. Further, the second uplink resource configured for the terminal device of the second type or belonging to the second terminal group has a longer period 1. The terminal device of the first type or belonging to the first terminal group may even send the backscattered signal on the second uplink configuration resource.

In some embodiments, the type of the terminal device includes a first type and a second type; the terminal group to which the terminal device belongs includes a first terminal group and a second terminal group; and the configuration resource includes a first downlink configuration resource for the first type or the first terminal group, and a second downlink configuration resource for the second type or the second terminal group.

In other words, the network device may configure the specific downlink configuration resource (i.e., a first downlink configuration resource) for the terminal device of the first type or belonging to the first terminal group, which is different from an downlink configuration resource (i.e., the second downlink configuration resource) configured for the terminal device of the second type or belonging to the second terminal group. Correspondingly, the terminal device listens for the downlink signal sent from the network device, based on the downlink configuration resource for the type of the terminal device or the terminal group to which the terminal device belongs. For example, in a case that the terminal device is of the first type or belongs to the first terminal group, the terminal device may send the backscattered signal based on the first downlink configuration resource. In a case that the terminal device is of the second type or belongs to the second terminal group, the terminal device may send the backscattered signal based on the second downlink configuration resource.

For the semi-passive terminal with zero power consumption, it may also need to receive downlink transmission regularly. The semi-passive terminal with zero power consumption obtains wireless energy based on radio waves in a harvesting space, and the radio waves may be a power supply signal sent by the network node or a wireless signal sent by other devices, such as a WIFI router. When a certain amount of electricity is obtained (for example, the capacitor voltage is greater than a specific threshold), the semi-passive terminal with zero power consumption is activated and the harvested power is used to drive the low-power-consumption circuit of the semi-passive terminal with zero power consumption to operate, for example, to listen for the information sent by the network node, such as a scheduling signaling, a reference signal, a synchronization signal, and the like.

For the terminal device of the first type or belonging to the first terminal group, due to the low efficiency of the power harvesting, it is not expected for the terminal device of the first type or belonging to the first terminal group to frequently detect the downlink transmission and consume the stored power. Generally speaking, the transmission resource is configured semi-statically, such as a search space of PDCCH and configuration of a CSI-RS resource. For a channel carrying a dynamic scheduling signaling, the terminal device may periodically listen at channel listening opportunities, but the scheduling signaling is often not sent frequently. For the terminal device of the first type or belonging to the first terminal group, it is expected that the listening for the downlink transmission should not be too frequent, so as to reduce unnecessary power consumption. Based on this, in the embodiment, the network device may configure the specific downlink transmission resource for the terminal device of the first type or belonging to the first terminal group, to reduce the reception of the downlink transmission.

In an embodiment, the first downlink configuration resource is completely or partially different from the second downlink configuration resource; or, the second downlink configuration resource includes the first downlink configuration resource.

As an example, the first downlink configuration resource is a first downlink unlicensed resource, and the second downlink configuration resource is a second downlink unlicensed resource. The first downlink unlicensed resource is completely or partially different from the second downlink unlicensed resource; or, the second downlink unlicensed resource includes the first downlink unlicensed resource.

In an embodiment, the first downlink configuration resource or the second downlink configuration resource is a resource configured to transmit a specific downlink signal. For example, the specific downlink signal includes, but is not limited to, a PDCCH, a PDSCH, a reference signal, a synchronization signal, and the like. For another example, the specific downlink signal may be a reference signal for measurement and synchronization.

In an embodiment, the second downlink configuration resource is greater than the first downlink configuration resource.

As an example, the number of time elements of the second downlink configuration resource is greater than the number of time elements of the first downlink configuration resource; or, a length of the time-domain resource of the second downlink configuration resource is greater than a length of the time-domain resource of the first downlink configuration resource. As another example, the number of physical resource blocks of the second downlink configuration resource is greater than the number of physical resource blocks of the first downlink configuration resource; or, a width of the frequency-domain resource of the second downlink configuration resource is greater than a width of the frequency-domain resource of the first downlink configuration resource.

In some embodiments, the first downlink configuration resource includes a resource obtained through a first Discontinuous Reception (DRX) configuration, and the second downlink configuration resource includes a resource obtained through a second DRX configuration.

In an embodiment, a resource obtained based on the first DRX configuration for listening for the downlink signal is completely or partially different from a resource obtained based on the second DRX configuration for listening for the downlink signal; or, the resource obtained based on the second DRX configuration for listening for the downlink signal includes the resource obtained based on the second DRX configuration for listening for the downlink signal.

In an embodiment, a period of the first DRX configuration is greater than a period of the second DRX configuration.

In an embodiment, the first DRX configuration or the second DRX configuration includes configuration information of at least one of the following: a drx-onDurationTimer or a drx-InactivityTimer.

As an example, duration of the drx-onDurationTimer of the first DRX configuration is less than duration of the drx-onDurationTimer of the second DRX configuration. As another example, duration of the drx-InactivityTimer of the first DRX configuration is less than duration of the drx-InactivityTimer of the second DRX configuration. Duration of an activation period may be controlled by the drx-onDurationTimer and the drx-InactivityTimer. Here, the drx-onDurationTimer is also referred to as a DRX-on period timer. The InactivityTimer is also referred to as an inactive timer. Specifically, the activation period ends when the drx-onDurationTime fails. The terminal device extends the duration of the activation period by starting the drx-InactivityTimer.

In some embodiments, the first downlink configuration resource includes at least one first time element, and the second downlink configuration resource includes at least one second time element.

As an example, the at least one first time element is also at least one first listening occasion, that is, the at least one first listening occasion may be used to form a set of listening occasions. As another example, the at least one first time element is also referred to as at least one second listening occasion, that is, the at least one second listening occasion may be used to form a set of listening occasions. In other words, the network device may configure a specific set of listening occasions for listening for the scheduling signaling for the terminal device of the first type or belonging to the first terminal group. For example, the search space of PDCCH is for the reception of the channel carrying the scheduling signaling. That is, the network device may configure the specific set of listening occasions for the terminal devices of the first type or belonging to the first terminal group. For example, there is a long interval between the specific set of listening occasions configured by the network device for the terminal devices of the first type or belonging to the first terminal group. Thus, such type of terminals can complete the power harvesting after the reception of the downlink channel, and then perform the reception of the next downlink channel.

In an embodiment, the at least one first time element is completely or partially different from the at least one second time element; or, the at least one second time element includes the at least one first time element.

In an embodiment, an interval between the at least one first time element is greater than an interval between the at least one second time element.

FIG. 8 is a block diagram of a first downlink configuration resource and a second downlink configuration resource according to an embodiment of the present disclosure.

As shown in FIG. 8, the terminal device of the first type or belonging to the first terminal group may be configured with at least one first time element, which has a longer period 2. Therefore, the listening for the downlink channel by the terminal device of the first type or belonging to the first terminal group can be reduced, and the power consumption of such type of terminals can be further reduced. Further, the terminal device of the second type or belonging to the second terminal group may be configured with at least one second time element, which has a shorter period 1. The terminal device of the second type or belonging to the second terminal group may even listen for the downlink signal on the at least one first time element.

In some embodiments, the operation S210 may include the following.

The type of the terminal device or the terminal group to which the terminal device belongs is determined based on a power harvesting speed of the terminal device In an embodiment, in a case that the power harvesting speed of the terminal device is less than or equal to a first threshold, the type of the terminal device is determined to be a first type, or, the terminal group is determined to be a first terminal group; otherwise, the type of the terminal device is determined to be a second type, or, the terminal group is determined to be a second terminal group.

In other words, based on the power harvesting speed, the terminal device may determine whether the terminal device is of the first type or belongs to the first terminal group, or the terminal device is of the second type or belongs to the second terminal group. For example, when the terminal device is far away from the network device, the power harvesting speed is very slow, and the harvesting current obtained is small (such as lower than a first current threshold), the terminal device may be classified as the first type or the first terminal group. Otherwise, the terminal device may be classified as the second type or the second terminal group.

In some embodiments, the operation S210 may include the following.

The type of the terminal device or the terminal group to which the terminal device belongs is determined based on a signal strength measured by the terminal device.

In an embodiment, in a case that the signal strength or a signal voltage measured by the terminal device is less than or equal to a second threshold, the type of the terminal device is determined to be a first type, or, the terminal group is determined to be a first terminal group; otherwise, the type of the terminal device is determined to be a second type, or, the terminal group is determined to be a second terminal group.

In other words, based on the measured signal strength, the terminal device may determine whether the terminal device is of the first type or belongs to the first terminal group, or is of the second type or belongs to the second terminal group. For example, the terminal device has a measurement function, and can measure the specific signal sent by the network device to obtain the signal strength or signal voltage, and the like. The signal strength or signal voltage is compared with the second threshold to determine the type of the terminal device or the terminal group to which the terminal device belongs. For example, if the measured signal strength or the measured signal voltage is less than or equal to the second threshold, the type of the terminal device is determined to be a first type, or, the terminal group is determined to be a first terminal group. Otherwise, the type of the terminal device is determined to be a second type, or, the terminal group is determined to be a second terminal group. In an embodiment, the specific signal includes, but is not limited to, a power supply signal, another downlink signal, a downlink scheduling signal and any other downlink signal sent by the network device.

In some embodiments, the operation S210 may include the following.

The type of the terminal device or the terminal group to which the terminal device belongs is determined based on deployment of a network device.

In an embodiment, in a case that a distance between the terminal device and the network device is greater than or equal to a third threshold, the type of the terminal device is determined to be a first type, or, the terminal group is determined to be a first terminal group; otherwise, the type of the terminal device is determined to be a second type, or, the terminal group is determined to be a second terminal group.

In other words, based on actual deployment parameters, the terminal device may determine whether the terminal device is of the first type or belongs to the first terminal group, or is of the second type or belongs to the second terminal group. For example, when deploying the network, information such as the type of the terminal device, a location where the terminal device is deployed, and a planning of the network may be used to determine whether the terminal device is of the first type or belongs to the first terminal group, or is of the second type or belongs to the second terminal group. For example, for a terminal device far away from the network device, such as a terminal device whose distance is greater than the third threshold, the terminal device may be classified as the first type or the first terminal group. Otherwise, the terminal device may be classified as the second type or the second terminal group.

In some embodiments, the operation S210 may include the following.

Storage information of the terminal device is obtained.

A type comprised in the storage information is determined to be the type of the terminal device or the terminal group to which the terminal device belongs.

In an embodiment, the storage information is stored in at least one of the following:

a memory, a subscriber identity module (SIM), or an Embedded subscriber identity module (eSIM).

In other words, the type of the terminal device or the terminal group to which the terminal device belongs may be written in the terminal device. For example, the type of vthe terminal device or the terminal group to which the terminal device belongs may be written in the memory, the SIM, or the eSIM.

In some embodiments, the operation S220 may include the following.

Upon completion of power harvesting or charging, the backscattered signal is sent or the downlink signal is listened for, based on the configuration resource.

In some embodiments, the operation S220 may include the following.

In a case that a quantity of electric charge obtained by the terminal device is greater than or equal to a preset value, the backscattered signal is sent or the downlink signal is listened for, based on the configuration resource.

In some embodiments, the method 200 may further include the following.

Configuration information is received.

Herein, the configuration information is used for a terminal device to determine a configuration resource for a type of the terminal device or a terminal group to which the terminal device belongs from resources configured according to the configuration information.

Preferred embodiments of the present disclosure have been described in detail with reference to the accompanying drawings, but the present disclosure is not limited to the specific details of the aforementioned embodiments. Within the scope of the technical conception of the present disclosure, various simple modifications can be made to the technical solution of the present disclosure, and such simple modifications all belong to the scope of protection of the present disclosure. For example, each of the specific technical features described in the aforementioned specific implementations may be combined in any suitable manner without contradiction, and various possible combinations are not further described in the present disclosure in order to avoid unnecessary repetition. For another example, any combination may be made between the various implementations of the present disclosure so long as it does not depart from the idea of the present disclosure, and is likewise to be regarded as the content of the present disclosure.

It should also be noted that, in the various method embodiments of the present disclosure, the size of the sequence number of the aforementioned processes does not mean the sequence of execution. The sequence of execution of the processes should be determined by their functions and inherent logics, and should not constitute any limitation on the implementation processes of the embodiments of the present disclosure. Further, in the embodiments of the present disclosure, the terms “downlink” and “uplink” are used to represent a transmission direction of the signal or data. Here, “downlink” is used to represent the transmission direction of the signal or data as a first direction transmitted from a station to a user device of a cell, and “uplink” is used to represent the transmission direction of the signal or data as a second direction transmitted from the user device of the cell to the station. For example, “downlink signal” means that the transmission direction of the signal is the first direction. Additionally, in the embodiments of the present disclosure, the term “and/or” only indicates an association relationship for describing associated objects and represents that there are three relationships. Specifically, A and/or B may represent three conditions: i.e., independent existence of A, existence of both A and B, and independent existence of B. In addition, the character “/” in the present disclosure generally represents that previous and next associated objects form an “or” relationship.

As mentioned above, with reference to FIG. 6, the wireless communication method according to the embodiment of the present disclosure is described in detail from the perspective of the terminal device. Further, with reference to FIG. 9, the wireless communication method according to the embodiment of the present disclosure is described below from the perspective of the network device.

FIG. 9 is a schematic flowchart of a wireless communication method 300 according to an embodiment of the present disclosure. The method 300 may be performed by a communication device, such as the network device as shown in FIG. 1.

As shown in FIG. 9, the method 300 includes the following operation S310.

At S310, configuration information is sent.

Herein, the configuration information is used for a terminal device to determine a configuration resource for a type of the terminal device or a terminal group to which the terminal device belongs from resources configured according to the configuration information.

In some embodiments, the type of the terminal device includes a first type and a second type; the terminal group to which the terminal device belongs includes a first terminal group and a second terminal group; at least one of the first type or the first terminal group includes terminal devices with limited power; and at least one of the second type or the second terminal group includes other terminal devices than the terminal devices with the limited power.

In some embodiments, the type of the terminal device includes a first type and a second type; the terminal group to which the terminal device belongs includes a first terminal group and a second terminal group; and the configuration resource includes a first uplink configuration resource for the first type or the first terminal group, and a second uplink configuration resource for the second type or the second terminal group.

In some embodiments, the first uplink configuration resource is completely or partially different from the second uplink configuration resource; or, the first uplink configuration resource includes the second uplink configuration resource.

In some embodiments, the first uplink configuration resource or the second uplink configuration resource includes at least one of a contention resource or an unlicensed resource.

In some embodiments, the first uplink configuration resource is greater than the second uplink configuration resource.

In some embodiments, a period of the first uplink configuration resource is less than a period of the second uplink configuration resource.

In some embodiments, the second uplink configuration resource is configured to transmit a backscattered signal of the second type or the second terminal group, and a backscattered signal of the first type or the first terminal group.

In some embodiments, the type of the terminal device includes a first type and a second type; the terminal group to which the terminal device belongs includes a first terminal group and a second terminal group; and the configuration resource includes a first downlink configuration resource for the first type or the first terminal group, and a second downlink configuration resource for the second type or the second terminal group.

In some embodiments, the first downlink configuration resource is completely or partially different from the second downlink configuration resource; or, the second downlink configuration resource includes the first downlink configuration resource.

In some embodiments, the first downlink configuration resource or the second downlink configuration resource is a resource configured to transmit a specific downlink signal.

In some embodiments, the second downlink configuration resource is greater than the first downlink configuration resource.

In some embodiments, the first downlink configuration resource includes a resource obtained through a first Discontinuous Reception (DRX) configuration, and the second downlink configuration resource includes a resource obtained through a second DRX configuration.

In some embodiments, a resource obtained based on the first DRX configuration for listening for the downlink signal is completely or partially different from a resource obtained based on the second DRX configuration for listening for the downlink signal; or, the resource obtained based on the second DRX configuration for listening for the downlink signal includes the resource obtained based on the second DRX configuration for listening for the downlink signal.

In some embodiments, a period of the first DRX configuration is greater than a period of the second DRX configuration.

In some embodiments, the first DRX configuration or the second DRX configuration includes configuration information of at least one of the following: a drx-onDurationTimer or a drx-InactivityTimer.

In some embodiments, the first downlink configuration resource includes at least one first time element, and the second downlink configuration resource includes at least one second time element.

In some embodiments, the at least one first time element is completely or partially different from the at least one second time element; or, the at least one second time element includes the at least one first time element.

In some embodiments, an interval between the at least one first time element is greater than an interval between the at least one second time element.

It should be noted that the steps in the method 300 may be referred to the corresponding steps in the method 200, and will not be repeated here for the sake of brevity.

The embodiments of the method of the present disclosure are described in detail above with reference to FIGS. 1 to 9, and embodiments of the apparatus of the present disclosure are described in detail below with reference to FIGS. 10 to 13.

FIG. 10 is a block diagram of a terminal device 400 according to an embodiment of the present disclosure.

As shown in FIG. 10, the terminal device 400 may include a determination unit 410 and a communication unit 420.

The determination unit 410 is configured to determine a type of a terminal device or a terminal group to which the terminal device belongs.

The communication unit 420 is configured to send a backscattered signal or listen for a downlink signal, based on a configuration resource for the type of the terminal device or the terminal group to which the terminal device belongs.

In some embodiments, the type of the terminal device includes a first type and a second type; the terminal group to which the terminal device belongs includes a first terminal group and a second terminal group; at least one of the first type or the first terminal group includes terminal devices with limited power; and at least one of the second type or the second terminal group includes other terminal devices than the terminal devices with the limited power.

In some embodiments, the type of the terminal device includes a first type and a second type; the terminal group to which the terminal device belongs includes a first terminal group and a second terminal group; and the configuration resource includes a first uplink configuration resource for the first type or the first terminal group, and a second uplink configuration resource for the second type or the second terminal group.

In some embodiments, the first uplink configuration resource is completely or partially different from the second uplink configuration resource; or, the first uplink configuration resource includes the second uplink configuration resource.

In some embodiments, the first uplink configuration resource or the second uplink configuration resource includes at least one of a contention resource or an unlicensed resource.

In some embodiments, the first uplink configuration resource is greater than the second uplink configuration resource.

In some embodiments, a period of the first uplink configuration resource is less than a period of the second uplink configuration resource.

In some embodiments, the second uplink configuration resource is configured to transmit a backscattered signal of the second type or the second terminal group, and a backscattered signal of the first type or the first terminal group.

In some embodiments, the type of the terminal device includes a first type and a second type; the terminal group to which the terminal device belongs includes a first terminal group and a second terminal group; and the configuration resource includes a first downlink configuration resource for the first type or the first terminal group, and a second downlink configuration resource for the second type or the second terminal group.

In some embodiments, the first downlink configuration resource is completely or partially different from the second downlink configuration resource; or, the second downlink configuration resource includes the first downlink configuration resource.

In some embodiments, the first downlink configuration resource or the second downlink configuration resource is a resource configured to transmit a specific downlink signal.

In some embodiments, the second downlink configuration resource is greater than the first downlink configuration resource.

In some embodiments, the first downlink configuration resource includes a resource obtained through a first Discontinuous Reception (DRX) configuration, and the second downlink configuration resource includes a resource obtained through a second DRX configuration.

In some embodiments, a resource obtained based on the first DRX configuration for listening for the downlink signal is completely or partially different from a resource obtained based on the second DRX configuration for listening for the downlink signal; or, the resource obtained based on the second DRX configuration for listening for the downlink signal includes the resource obtained based on the second DRX configuration for listening for the downlink signal.

In some embodiments, a period of the first DRX configuration is greater than a period of the second DRX configuration.

In some embodiments, the first DRX configuration or the second DRX configuration includes configuration information of at least one of the following: a drx-onDurationTimer or a drx-InactivityTimer.

In some embodiments, the first downlink configuration resource includes at least one first time element, and the second downlink configuration resource includes at least one second time element.

In some embodiments, the at least one first time element is completely or partially different from the at least one second time element; or, the at least one second time element includes the at least one first time element.

In some embodiments, an interval between the at least one first time element is greater than an interval between the at least one second time element.

In some embodiments, the determination unit 410 is specifically configured to:

determine, based on a power harvesting speed of the terminal device, the type of the terminal device or the terminal group to which the terminal device belongs.

In some embodiments, the determination unit 410 is specifically configured to:

in a case that the power harvesting speed of the terminal device is less than or equal to a first threshold, determine the type of the terminal device to be a first type, or, determine the terminal group to which the terminal device belongs to be a first terminal group; otherwise, determine the type of the terminal device to be a second type, or, determine the terminal group to which the terminal device belongs to be a second terminal group.

In some embodiments, the determination unit 410 is specifically configured to:

determine, based on a signal strength measured by the terminal device, the type of the terminal device or the terminal group to which the terminal device belongs.

In some embodiments, the determination unit 410 is specifically configured to:

in a case that the signal strength or a signal voltage measured by the terminal device is less than or equal to a second threshold, determine the type of the terminal device to be a first type, or, determine the terminal group to which the terminal device belongs to be a first terminal group; otherwise, determine the type of the terminal device to be a second type, or, determine the terminal group to which the terminal device belongs to be a second terminal group.

In some embodiments, the determination unit 410 is specifically configured to:

determine, based on deployment of a network device, the type of the terminal device or the terminal group to which the terminal device belongs.

In some embodiments, the determination unit 410 is specifically configured to:

in a case that a distance between the terminal device and the network device is greater than or equal to a third threshold, determine the type of the terminal device to be a first type, or, determine the terminal group to which the terminal device belongs to be a first terminal group; otherwise, determine the type of the terminal device to be a second type, or, determine the terminal group to which the terminal device belongs to be a second terminal group.

In some embodiments, the determination unit 410 is specifically configured to:

obtain storage information of the terminal device; and determine a type comprised in the storage information to be the type of the terminal device or the terminal group to which the terminal device belongs.

In some embodiments, the storage information is stored in at least one of the following:

a memory, a subscriber identity module (SIM), or an embedded subscriber identity module (eSIM).

In some embodiments, the communication unit 420 is specifically configured to:

upon completion of power harvesting or charging, send the backscattered signal or listening for the downlink signal, based on the configuration resource.

In some embodiments, the communication unit 420 is specifically configured to:

in a case that a quantity of electric charge obtained by the terminal device is greater than or equal to a preset value, send the backscattered signal or listening for the downlink signal based on the configuration resource.

In some embodiments, the communication unit 420 is further configured to:

receive configuration information.

Herein, the configuration information is used for a terminal device to determine a configuration resource for a type of the terminal device or a terminal group to which the terminal device belongs from resources configured according to the configuration information.

It should be noted that apparatus embodiments and method embodiments may correspond to each other, and similar descriptions may be referred to the method embodiments. Specifically, the terminal device 400 shown in FIG. 10 may correspond to a respective body for executing the method 200 in the embodiments of the present disclosure. The foregoing and other operations and/or functions of each unit in the terminal device 400 are respectively configured to implement the corresponding process in each method in FIG. 6, and will not be repeated here for the sake of brevity.

Figure 11:
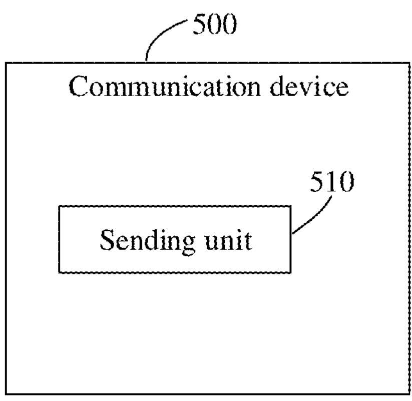
FIG. 11 is a block diagram of a communication device according to an embodiment of the present disclosure.

FIG. 11 is a block diagram of a communication device 500 according to an embodiment of the present disclosure.

As shown in FIG. 11, the communication device 500 may include a sending unit 510.

The sending unit 510 is configured to send configuration information.

Herein, the configuration information is used for a terminal device to determine a configuration resource for a type of the terminal device or a terminal group to which the terminal device belongs from resources configured according to the configuration information.

In some embodiments, the type of the terminal device includes a first type and a second type; the terminal group to which the terminal device belongs includes a first terminal group and a second terminal group; at least one of the first type or the first terminal group includes terminal devices with limited power; and at least one of the second type or the second terminal group includes other terminal devices than the terminal devices with the limited power.

In some embodiments, the type of the terminal device includes a first type and a second type; the terminal group to which the terminal device belongs includes a first terminal group and a second terminal group; and the configuration resource includes a first uplink configuration resource for the first type or the first terminal group, and a second uplink configuration resource for the second type or the second terminal group.

In some embodiments, the first uplink configuration resource is completely or partially different from the second uplink configuration resource; or, the first uplink configuration resource includes the second uplink configuration resource.

In some embodiments, the first uplink configuration resource or the second uplink configuration resource includes at least one of a contention resource or an unlicensed resource.

In some embodiments, the first uplink configuration resource is greater than the second uplink configuration resource.

In some embodiments, a period of the first uplink configuration resource is less than a period of the second uplink configuration resource.

In some embodiments, the second uplink configuration resource is configured to transmit a backscattered signal of the second type or the second terminal group, and a backscattered signal of the first type or the first terminal group.

In some embodiments, the type of the terminal device includes a first type and a second type; the terminal group to which the terminal device belongs includes a first terminal group and a second terminal group; and the configuration resource includes a first downlink configuration resource for the first type or the first terminal group, and a second downlink configuration resource for the second type or the second terminal group.

In some embodiments, the first downlink configuration resource is completely or partially different from the second downlink configuration resource; or, the second downlink configuration resource includes the first downlink configuration resource.

In some embodiments, the first downlink configuration resource or the second downlink configuration resource is a resource configured to transmit a specific downlink signal.

In some embodiments, the second downlink configuration resource is greater than the first downlink configuration resource.

In some embodiments, the first downlink configuration resource includes a resource obtained through a first Discontinuous Reception (DRX) configuration, and the second downlink configuration resource includes a resource obtained through a second DRX configuration.

In some embodiments, a resource obtained based on the first DRX configuration for listening for the downlink signal is completely or partially different from a resource obtained based on the second DRX configuration for listening for the downlink signal; or, the resource obtained based on the second DRX configuration for listening for the downlink signal includes the resource obtained based on the second DRX configuration for listening for the downlink signal.

In some embodiments, a period of the first DRX configuration is greater than a period of the second DRX configuration.

In some embodiments, the first DRX configuration or the second DRX configuration includes configuration information of at least one of the following: a drx-onDurationTimer or a drx-InactivityTimer.

In some embodiments, the first downlink configuration resource includes at least one first time element, and the second downlink configuration resource includes at least one second time element.

In some embodiments, the at least one first time element is completely or partially different from the at least one second time element; or, the at least one second time element includes the at least one first time element.

In some embodiments, an interval between the at least one first time element is greater than an interval between the at least one second time element.

It should be noted that apparatus embodiments and method embodiments may correspond to each other, and similar descriptions may be referred to the method embodiments. Specifically, the communication device 500 shown in FIG. 11 may correspond to a respective body for executing the method 300 in the embodiments of the present disclosure. The foregoing and other operations and/or functions of each unit in the communication device 500 are respectively configured to implement the corresponding process in each method in FIG. 9, and will not be repeated here for the sake of brevity.

The communication device of the embodiments of the present disclosure is described above from the perspective of functional modules with reference to the accompanying drawings. It should be understood that the functional modules may be implemented in a hardware form, by instructions in software form, or by a combination of hardware and software modules. Specifically, each step of the method embodiments in the embodiments of the present disclosure may be completed by an integrated logic circuit of the hardware in a processor and/or an instruction in a form of software. The operations of the method disclosed in combination with the embodiments of the present disclosure may be directly embodied to be executed and implemented by a hardware decoding processor or executed and implemented by a combination of hardware and software modules in the decoding processor. In an embodiment, the software module may be located in a mature storage medium in this field such as a Random Access Memory (RAM), a flash memory, a Read-Only Memory (ROM), a Programmable ROM (PROM), an Electrically Erasable PROM (EEPROM), a register, and the like. The storage medium is located in a memory, and the processor reads information in the memory, and implements the steps of the aforementioned method embodiments in combination with the hardware.

For example, the determination unit 410 referred to above may be implemented by a processor, and the determination unit 410 and the sending unit 510 referred to above may be implemented by a transceiver.

Figure 12:
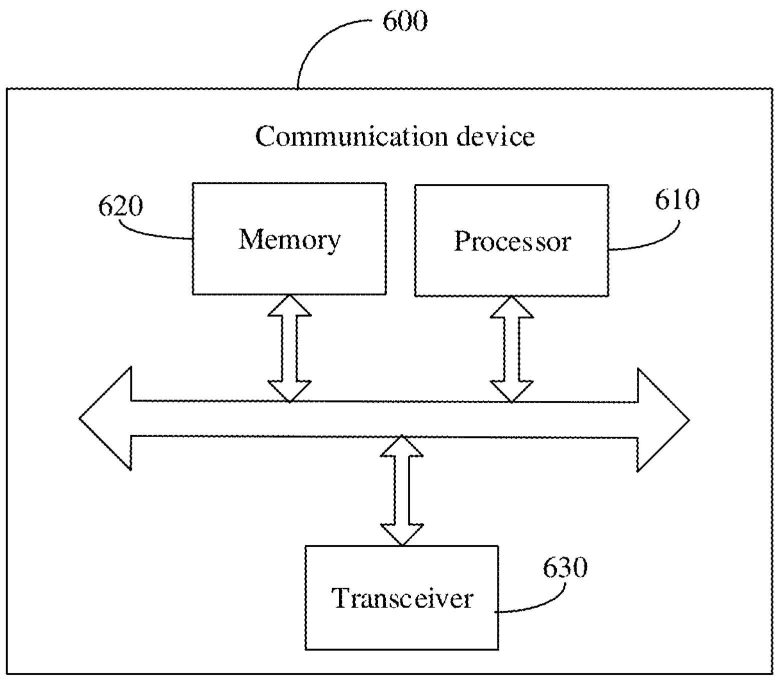
FIG. 12 is a block diagram of a communication device according to another embodiment of the present disclosure.

FIG. 12 is a schematic structural diagram of a communication device 600 according to an embodiment of the present disclosure.

As shown in FIG. 12, the communication device 600 may include a processor 610.

The processor 610 may call and run a computer program from a memory to implement the method in the embodiments of the present disclosure.

As shown in FIG. 12, the communication device 600 may include a memory 620.

Herein, the memory 620 may be configured to store indication information, and further configured to store codes, instructions and the like executed by the processor 610. The processor 610 may call and run a computer program from the memory 620 to implement the method in embodiments of the present disclosure. The memory 620 may be a separate device independent of the processor 610 or may be integrated within the processor 610.

As shown in FIG. 12, the communication device 600 may further include a transceiver 630.

Herein, the processor 610 may control the transceiver 630 to communicate with other devices. Specifically, the transceiver 630 may transmit information or data to other devices, or receive information or data from other devices. The transceiver 630 may include a transmitter and a receiver. The transceiver 630 may further include one or more antennas.

It should be noted that the various components in the communication device 600 are connected by a bus system including, in addition to a data bus, a power bus, a control bus and a status signal bus.

It should be further noted that the communication device 600 may be the terminal device in the embodiments of the present disclosure. The communication device 600 may implement the corresponding processes implemented by the terminal device in each method of the embodiments of the present disclosure. That is, the communication device 600 in the embodiments of the present disclosure may correspond to the terminal device 400 in the embodiments of the present disclosure, and may also correspond to the respective body for executing the method 200 in the embodiments of the present disclosure, which will not be repeated here for the sake of brevity. Similarly, the communication device 600 may be the network device in the embodiments of the present disclosure. The communication device 600 may implement the corresponding processes implemented by the network device in each method of the embodiments of the present disclosure. That is, the communication device 600 in the embodiments of the present disclosure may correspond to the communication device 500 in the embodiments of the present disclosure, and may also correspond to the respective body for executing the method 300 in the embodiments of the present disclosure, which will not be repeated here for the sake of brevity.

In addition, embodiments of the present disclosure further provide a chip.

For example, the chip may be an integrated circuit chip having a signal processing function that can implement or perform the methods, steps and logic diagrams disclosed in the embodiments of the present disclosure. The chip mentioned in the embodiments of the present disclosure may also be referred as a system-level chip, a system chip, a chip system, or a system-on chip, and the like. In an embodiment, the chip may be applied to various communication devices, enabling the communication devices mounted with the chip to perform the methods, steps and logic diagrams disclosed in the embodiments of the present disclosure.

Figure 13:
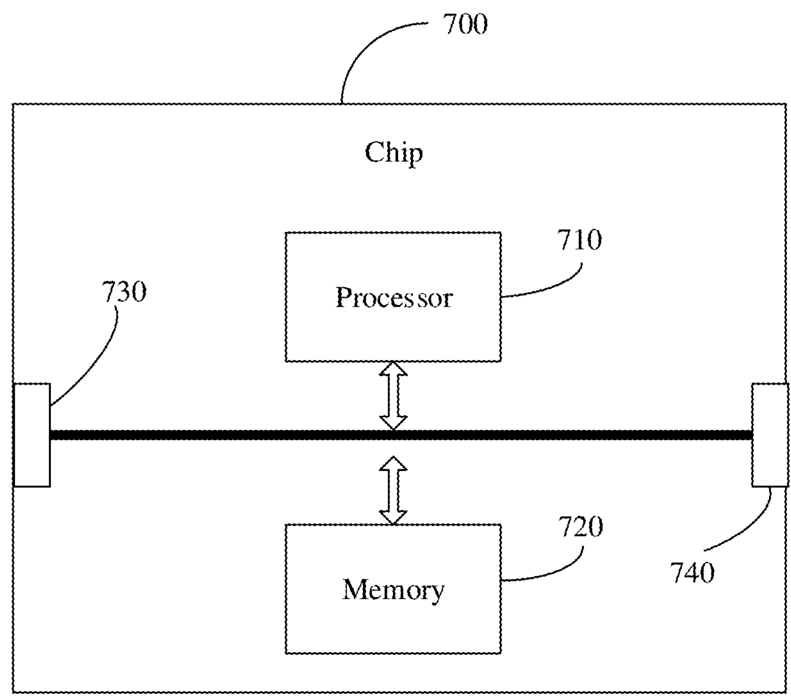
FIG. 13 is a block diagram of a chip according to an embodiment of the present disclosure.

FIG. 13 is a schematic structural diagram of a chip 700 according to an embodiment of the present disclosure.

As shown in FIG. 13, the chip 700 includes a processor 710.

The processor 710 may call and run a computer program from a memory to implement the method in the embodiments of the present disclosure.

As shown in FIG. 13, the chip 700 includes a memory 720.

Herein, the processor 710 may call and run a computer program from the memory 720 to implement the method in the embodiments of the present disclosure. The memory 720 may be configured to store indication information, and further configured to store codes, instructions and the like executed by the processor 710. The memory 720 may be a separate device independent of the processor 710 or may be integrated within the processor 710.

As shown in FIG. 13, the chip 700 may further include an input interface 730.

Herein, the processor 710 may control the input interface 730 to communicate with other devices or chips. Specifically, the input interface 730 may acquire information or data from other devices and chips.

As shown in FIG. 13, the chip 700 may further include an output interface 740.

Herein, the processor 710 may control the output interface 740 to communicate with other devices or chips. Specifically, the output interface 740 may output information or data to other devices and chips.

It should be noted that, the chip 700 may be applied to the network device in the embodiments of the present disclosure, and the chip may implement the corresponding processes implemented by the network device in each method of the embodiments of the present disclosure. The chip may further implement the corresponding processes implemented by the terminal device in each method of the embodiments of the present disclosure. For brevity, details will not be repeated herein again.

It should be further noted that the various components in the chip 700 are connected by a bus system including, in addition to a data bus, a power bus, a control bus and a status signal bus.

The processor referred to above may include, but are not limited to the following:

a universal processor, a Digital Signal Processor (DSP), an Application Specific Integrated Circuit (ASIC), a Field Programmable Gate Array (FPGA) or another programmable logical device, discrete gate or transistor logical device and discrete hardware component, and the like.

The processor may be configured to implement or perform the methods, steps and logic diagrams disclosed in the embodiments of the present disclosure. The operations of the method disclosed in combination with the embodiments of the present disclosure may be directly embodied to be executed and implemented by a hardware decoding processor or executed and implemented by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and implements the steps of the methods in combination with hardware.

The memory referred to above may include, but are not limited to the following:

a volatile memory and/or a nonvolatile memory. The nonvolatile memory may be a ROM, a PROM, an Erasable PROM (EPROM), an EEPROM or a flash memory. The volatile memory may be a RAM, which is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a synch link DRAM (SLDRAM) and a Direct Rambus RAM (DR RAM).

It is to be noted that the memory described in the present disclosure is intended to include, but not limited to, memories of these and any other proper types.

Embodiments of the present disclosure further provide a computer-readable storage medium for storing a computer program. The computer-readable storage medium stores one or more programs including instructions. When executed by a portable electronic device including a plurality of application programs, the instructions enable the portable electronic device to perform the wireless communication method provided herein. In an embodiment, the computer-readable storage medium may be applied to the network device in the embodiment of the present disclosure, and the computer program is executed to enable the computer to perform processes implemented by the network device in each method of the embodiment of the present disclosure.

For brevity, details will not be repeated herein again. In an embodiment, the computer-readable storage medium may be applied to the mobile terminal/terminal in the embodiment of the present disclosure, and the computer program enables the computer to perform the processes implemented by the mobile terminal/terminal in each method of the embodiment of the present disclosure. For brevity, details will not be repeated herein again.

The embodiments of the present disclosure further provide a computer program product, including a computer program. In an embodiment, the computer program product may be applied to the network device in the embodiment of the present disclosure, and the computer program is executed to enable the computer to perform the processes implemented by the network device in each method of the embodiment of the present disclosure. For brevity, details will not be repeated herein again. In an embodiment, the computer program product may be applied to the mobile terminal/terminal device in the embodiment of the present disclosure, and the computer program is executed to enable the computer to perform the processes implemented by the mobile terminal/terminal in each method of the embodiment of the present disclosure. For brevity, details will not be repeated herein again.

The embodiments of the present disclosure further provide a computer program. When executed by a computer, the computer program enables the computer to perform the wireless communication method provided herein. In an embodiment, the computer program may be applied to the network device in the embodiment of the present disclosure, and the computer program is run on a computer, to cause the computer to perform the processes implemented by the network device in each method of the embodiment of the present disclosure. For brevity, details will not be repeated herein again. In an embodiment, the computer program may be applied to the mobile terminal/terminal in the embodiment of the present disclosure, and the computer program is run on a computer, to cause the computer to perform the processes implemented by the mobile terminal/terminal in each method of the embodiment of the present disclosure. For brevity, details will not be repeated herein again.

The embodiments of the present disclosure provide a wireless communication method, a terminal device and a communication device, which can save power harvested by the terminal device and improve utilization efficiency of the power, thereby meeting the power demand of communication.

According to a first aspect of the present disclosure, a wireless communication method is provided, and the method includes the following operations.

A type of a terminal device or a terminal group to which the terminal device belongs is determined.

A backscattered signal is sent or a downlink signal is listened for, based on a configuration resource for the type of the terminal device or the terminal group to which the terminal device belongs.

According to a second aspect of the present disclosure, a wireless communication method is provided, and the method includes the following operation.

Configuration information is sent.

Herein, the configuration information is used for a terminal device to determine a configuration resource for a type of the terminal device or a terminal group to which the terminal device belongs from resources configured according to the configuration information.

According to a third aspect of the present disclosure, a terminal device is provided, and the terminal device is configured to implement the method in the aforementioned first aspect or implementations thereof. Specifically, the terminal device includes functional modules configured to implement the method in the aforementioned first aspect or implementations thereof.

In one implementation, the terminal device may include a processing unit for performing functions related to information processing. For example, the processing unit may be a processor.

In one implementation, the terminal device may include at least one of a sending unit or a receiving unit. The sending unit is configured to perform functions related to sending operations, and the receiving unit is configured to perform functions related to receiving operations. For example, the sending unit may be a sender or a transmitter, and the receiving unit may be a receiver or a receiving machine. For another example, the terminal device is a communication chip, the receiving unit may be an input circuit or an input interface of the communication chip, and the sending unit may be an output circuit or an output interface of the communication chip.

According to a fourth aspect of the present disclosure, a communication device is provided, and the communication device is configured to implement the method in the aforementioned second aspect or implementations thereof. Specifically, the communication device includes functional modules configured to implement the method in the aforementioned second aspect or implementations thereof.

In one implementation, the communication device may include a processing unit for performing functions related to information processing. For example, the processing unit may be a processor.

In one implementation, the communication device may include at least one of a sending unit or a receiving unit. The sending unit is configured to perform functions related to sending operations, and the receiving unit is configured to perform functions related to receiving operations. For example, the sending unit may be a sender or a transmitter, and the receiving unit may be a receiver or a receiving machine. For another example, the communication device is a communication chip, the receiving unit may be an input circuit or an input interface of the communication chip, and the sending unit may be an output circuit or an output interface of the communication chip.

According to a fifth aspect of the present disclosure, a terminal device is provided, and the terminal device includes a processor and a memory. The memory is configured to store a computer program, and the processor is configured to call and run the computer program stored in the memory to implement the method in the aforementioned first aspect or implementations thereof.

In one implementation, one or more processors are included, and one or more memories are included.

In one implementation, the memory may be integrated with the processor, or the memory may be arranged separately from the processor.

In one implementation, the terminal device may further include a sender (transmitter) or a receiver (receiving machine).

According to a sixth aspect of the present disclosure, a communication device is provided, and the communication device includes a processor and a memory. The memory is configured to store a computer program, and the processor is configured to call and run the computer program stored in the memory to implement the method in the aforementioned second aspect or implementations thereof.

In one implementation, one or more processors are included, and one or more memories are included.

In one implementation, the memory may be integrated with the processor, or the memory may be arranged separately from the processor.

In one implementation, the communication device may further include a sender (transmitter) or a receiver (receiving machine).

According to a seventh aspect of the present disclosure, a chip is provided, and the chip is configured to implement the method in one of the aforementioned first aspect and second aspect, or implementations thereof. Specifically, the chip includes a processor, configured to call and run a computer program in a memory to enable a device installed with the chip to implement the method in one of the aforementioned first aspect and second aspect, or implementations thereof.

According to an eighth aspect of the present disclosure, a computer-readable storage medium is provided, and the computer-readable storage medium is configured for storing a computer program. The computer program, when executed by a computer, enables the computer to implement the method in one of the aforementioned first aspect and second aspect, or implementations thereof.

According to a ninth aspect of the present disclosure, a computer program product is provided, and the computer program product includes computer program instructions. The computer program instructions, when executed by a computer, enable the computer to implement the method in one of the aforementioned first aspect and second aspect, or implementations thereof.

According to a tenth aspect of the present disclosure, a computer program is provided. The computer program, when executed by a computer, enables the computer to implement the method in one of the aforementioned first aspect and second aspect, or implementations thereof.

According to the above technical solutions, the backscattered signal is sent or the downlink signal is listened for, based on the configuration resource for the type of the terminal device or the terminal group to which the terminal device belongs. That is, different configuration resources are configured for terminal devices belonging to different types or different terminal groups, which can prevent resource confliction between terminal devices of different types or belonging to different groups, and also improve data transmission reliability. Particularly, for the terminal device with the limited power, such as the terminal that needs to harvest and store power for communication and is far away from the communication device, the success rate of resource contention can be improved by configuring dedicated resources for such type of terminals. Therefore, the time and power consumption required for successful data transmission can be reduced, the power harvested or stored by the terminal device can be saved, and the efficiency of power utilization can be improved, thereby meeting the power demand during the communication.

An embodiment of the present disclosure further provides a communication system. The communication system may include the aforementioned terminal device and network device to form the communication system 100 as shown in FIG. 1, which will not be repeated here for the sake of brevity. It should be noted that the term "system" herein may also be referred to as "network management architecture" or "network system".

It should further be noted that the terminology used in the embodiments of the present disclosure and the appended claims is for the purpose of describing specific embodiments only and is not intended to limit the embodiments of the present disclosure. For example, a singular forms of "an", "the", "aforementioned" and "this" as used in embodiments of the present disclosure and the appended claims are also intended to include a plurality of forms, unless the context clearly dictates otherwise.

Those skilled in the art may realize that the units and algorithm steps of each example described in combination with the embodiments disclosed in the present disclosure may be implemented by an electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the embodiments of the present disclosure. If the above functions are implemented in the form of a software function module and sold or used as an independent product, the functions may also be stored in a computer-readable storage medium. Based on such understanding, the essential part of the technical solutions of the embodiments of the present disclosure or a part of the technical solutions that contributes to related technologies or a part of the technical solutions can be implemented in the form of a software product. The computer software product is stored in a storage medium and includes several instructions to enable the computer device (which may be a personal computer, a server or a network device, etc.) to execute all or a part of the methods described in the various embodiments of the present disclosure. The forgoing storage media includes various mediums that can store program codes, such as a USB disk, a mobile hard disk, an ROM, an RAM, a magnetic disk, or an optical disk, and the like.

Those skilled in the art may further learn about that for the specific operating process of the system, device and unit described above, reference may be made to the corresponding processes in the method embodiment, and the specific operating process of the system, device and unit will not be elaborated herein for convenient and brief description. In some embodiments provided by the present disclosure, it should be noted that the disclosed system, device and method may be implemented in another manner. For example, the partition of units or modules or components in the aforementioned embodiments of the apparatus is only a logical functional partition, which may be implemented in another manner. For example, multiple units or modules or components may be combined or integrated into another system, or some units or modules or components may be ignored or not executed. For another example, the units/modules/components described above as the partitioned/displayed means may or may not be physically separated, i.e., may be located in one place, or may be distributed over a plurality of network elements. A part or all of the units/modules/components may be selected to achieve the purpose of the embodiments of the present disclosure according to a practical requirement. Lastly, it should be noted that, coupling or direct coupling or communication connection between each displayed or discussed component shown or discussed above may be indirect coupling or communication connection, implemented through some interfaces, of the device or the units, and may be electrical and mechanical or adopt other forms.

The foregoing contents are only the implementation of embodiments of the present disclosure, but the protection scope of the embodiments of the present disclosure is not limited thereto. Variation and substitution which can be readily thought by those skilled in the art within the technical scope disclosed in the embodiments of the present disclosure, should fall within the protection scope of the embodiments of the present disclosure. Therefore, the protection scope of the embodiments of the present disclosure should be subject to the protection scope of the claims.

The invention claimed is:

1. A wireless communication method, comprising:

determining a type of a terminal device or a terminal group to which the terminal device belongs; and sending a backscattered signal or listening for a downlink signal, based on a configuration resource for the type of the terminal device or the terminal group to which the terminal device belongs, wherein the type of the terminal device comprises a first type and a second type; the terminal group to which the terminal device belongs comprises a first terminal group and a second terminal group; and the configuration resource comprises a first uplink configuration resource for the first type or the first terminal group, a second uplink configuration resource for the second type or the second terminal group, a first downlink configuration resource for the first type or the first terminal group, and a second downlink configuration resource for the second type or the second terminal group;

wherein the first uplink configuration resource is completely or partially different from the second uplink configuration resource;

wherein the first downlink configuration resource is completely or partially different from the second downlink configuration resource; and wherein the first downlink configuration resource or the second downlink configuration resource is a resource configured to transmit a specific downlink signal.

2. The method of claim 1, wherein each terminal device of the first type or the first terminal group is capable of transmitting a backscattered signal, and each terminal device of the second type or the second terminal group is capable of transmitting a backscattered signal.

3. The method of claim 1, wherein determining the type of the terminal device or the terminal group to which the terminal device belongs comprises:

in a case that a power harvesting speed of the terminal device is less than or equal to a first threshold, determining the type of the terminal device to be a first type, or, determining the terminal group to which the terminal device belongs to be a first terminal group; otherwise, determining the type of the terminal device to be a second type, or, determining the terminal group to which the terminal device belongs to be a second terminal group;

in a case that a signal strength or a signal voltage measured by the terminal device is less than or equal to a second threshold, determining the type of the terminal device to be a first type, or, determining the terminal group to which the terminal device belongs to be a first terminal group; otherwise, determining the type of the terminal device to be a second type, or, determining the terminal group to which the terminal device belongs to be a second terminal group; or in a case that a distance between the terminal device and the network device is greater than or equal to a third threshold, determining the type of the terminal device to be a first type, or, determining the terminal group to which the terminal device belongs to be a first terminal group; otherwise, determining the type of the terminal device to be a second type, or, determining the terminal group to which the terminal device belongs to be a second terminal group.

4. The method of claim 1, wherein sending the backscattered signal or listening for the downlink signal, based on the configuration resource for the type of the terminal device or the terminal group to which the terminal device belongs comprises:

upon completion of power harvesting or charging, sending the backscattered signal or listening for the downlink signal, based on the configuration resource; or in a case that a quantity of electric charge obtained by the terminal device is greater than or equal to a preset value, sending the backscattered signal or listening for the downlink signal based on the configuration resource.

5. The method of claim 1, comprising:

receiving configuration information;

wherein the configuration information is used for the terminal device to determine the configuration resource for the type of the terminal device or the terminal group to which the terminal device belongs from resources configured according to the configuration information.

6. A wireless communication method, comprising:

sending configuration information;

wherein the configuration information is used for a terminal device to determine a configuration resource for a type of the terminal device or a terminal group to which the terminal device belongs from resources configured according to the configuration information, wherein the type of the terminal device comprises a first type and a second type; the terminal group to which the terminal device belongs comprises a first terminal group and a second terminal group; and the configuration resource comprises a first uplink configuration resource for the first type or the first terminal group, a second uplink configuration resource for the second type or the second terminal group, a first downlink configuration resource for the first type or the first terminal group, and a second downlink configuration resource for the second type or the second terminal group;

wherein the first uplink configuration resource is completely or partially different from the second uplink configuration resource;

wherein the first downlink configuration resource is completely or partially different from the second downlink configuration resource; and wherein the first downlink configuration resource or the second downlink configuration resource is a resource configured to transmit a specific downlink signal.

7. The method of claim 6, wherein each terminal device of the first type or the first terminal group is capable of transmitting a backscattered signal, and each terminal device of the second type or the second terminal group is capable of transmitting a backscattered signal.

8. The method of claim 6, wherein the first downlink configuration resource comprises a resource obtained through a first discontinuous reception (DRX) configuration, and the second downlink configuration resource comprises a resource obtained through a second DRX configuration; a resource obtained based on the first DRX configuration for listening for the downlink signal is completely or partially different from a resource obtained based on the second DRX configuration for listening for the downlink signal, or the resource obtained based on the second DRX configuration for listening for the downlink signal comprises the resource obtained based on the second DRX configuration for listening for the downlink signal; a period of the first DRX configuration is greater than a period of the second DRX configuration; the first DRX configuration or the second DRX configuration comprises configuration information of at least one of the following: a drx-onDurationTimer or a drx-InactivityTimer; or the first downlink configuration resource comprises at least one first time element, and the second downlink configuration resource comprises at least one second time element; the at least one first time element is completely or partially different from the at least one second time element, or the at least one second time element comprises the at least one first time element; and an interval between the at least one first time element is greater than an interval between the at least one second time element.

9. A terminal device, comprising:

a processor, configured to determine a type of a terminal device or a terminal group to which the terminal device belongs; and a transceiver, configured to send a backscattered signal or listen for a downlink signal, based on a configuration resource for the type of the terminal device or the terminal group to which the terminal device belongs, wherein the type of the terminal device comprises a first type and a second type; the terminal group to which the terminal device belongs comprises a first terminal group and a second terminal group; and the configuration resource comprises a first uplink configuration resource for the first type or the first terminal group, a second uplink configuration resource for the second type or the second terminal group, a first downlink configuration resource for the first type or the first terminal group, and a second downlink configuration resource for the second type or the second terminal group;

wherein the first uplink configuration resource is completely or partially different from the second uplink configuration resource;

wherein the first downlink configuration resource is completely or partially different from the second downlink configuration resource; and wherein the first downlink configuration resource or the second downlink configuration resource is a resource configured to transmit a specific downlink signal.

10. The terminal device of claim 9, wherein each terminal device of the first type or the first terminal group is capable of transmitting a backscattered signal, and each terminal device of the second type or the second terminal group is capable of transmitting a backscattered signal.

11. The terminal device of claim 9, wherein in determining the type of the terminal device or the terminal group to which the terminal device belongs, the processor is configured to:

in a case that a power harvesting speed of the terminal device is less than or equal to a first threshold, determine the type of the terminal device to be a first type, or determine the terminal group to which the terminal device belongs to be a first terminal group; otherwise, determine the type of the terminal device to be a second type, or determine the terminal group to which the terminal device belongs to be a second terminal group;

in a case that a signal strength or a signal voltage measured by the terminal device is less than or equal to a second threshold, determine the type of the terminal device to be a first type, or, determine the terminal group to which the terminal device belongs to be a first terminal group; otherwise, determine the type of the terminal device to be a second type, or, determine the terminal group to which the terminal device belongs to be a second terminal group; or in a case that a distance between the terminal device and the network device is greater than or equal to a third threshold, determine the type of the terminal device to be a first type, or determine the terminal group to which the terminal device belongs to be a first terminal group; otherwise, determine the type of the terminal device to be a second type, or determine the terminal group to which the terminal device belongs to be a second terminal group.

12. The terminal device of claim 9, wherein in sending the backscattered signal or listening for the downlink signal, based on the configuration resource for the type of the terminal device or the terminal group to which the terminal device belongs, the transceiver is configured to:

upon completion of power harvesting or charging, send the backscattered signal or listening for the downlink signal, based on the configuration resource; or in a case that a quantity of electric charge obtained by the terminal device is greater than or equal to a preset value, send the backscattered signal or listening for the downlink signal based on the configuration resource.

13. The terminal device of claim 9, wherein the transceiver is further configured to:

receive configuration information;

wherein the configuration information is used for the terminal device to determine the configuration resource for the type of the terminal device or the terminal group to which the terminal device belongs from resources configured according to the configuration information.

14. A communication device, comprising:

a transceiver, configured to send configuration information;

wherein the configuration information is used for a terminal device to determine a configuration resource for a type of the terminal device or a terminal group to which the terminal device belongs from resources configured according to the configuration information, wherein the type of the terminal device comprises a first type and a second type; the terminal group to which the terminal device belongs comprises a first terminal group and a second terminal group; and the configuration resource comprises a first uplink configuration resource for the first type or the first terminal group, a second uplink configuration resource for the second type or the second terminal group, a first downlink configuration resource for the first type or the first terminal group, and a second downlink configuration resource for the second type or the second terminal group;

wherein the first uplink configuration resource is completely or partially different from the second uplink configuration resource;

wherein the first downlink configuration resource is completely or partially different from the second downlink configuration resource; and wherein the first downlink configuration resource or the second downlink configuration resource is a resource configured to transmit a specific downlink signal.

15. The communication device of claim 14, wherein each terminal device of the first type or the first terminal group is capable of transmitting a backscattered signal, and each terminal device of the second type or the second terminal group is capable of transmitting a backscattered signal.

16. The communication device of claim 14, wherein the first downlink configuration resource comprises a resource obtained through a first discontinuous reception (DRX) configuration, and the second downlink configuration resource comprises a resource obtained through a second DRX configuration; a resource obtained based on the first DRX configuration for listening for the downlink signal is completely or partially different from a resource obtained based on the second DRX configuration for listening for the downlink signal, or the resource obtained based on the second DRX configuration for listening for the downlink signal comprises the resource obtained based on the second DRX configuration for listening for the downlink signal; a period of the first DRX configuration is greater than a period of the second DRX configuration; the first DRX configuration or the second DRX configuration comprises configuration information of at least one of the following: a drx-onDurationTimer or a drx-InactivityTimer; or the first downlink configuration resource comprises at least one first time element, and the second downlink configuration resource comprises at least one second time element; the at least one first time element is completely or partially different from the at least one second time element, or the at least one second time element comprises the at least one first time element; and an interval between the at least one first time element is greater than an interval between the at least one second time element.

* * * * *